United States Patent [19]
Okamoto et al.

[11] Patent Number: 6,018,513
[45] Date of Patent: Jan. 25, 2000

[54] COMMUNICATION CONTROL APPARATUS

[75] Inventors: Yasushi Okamoto; Akiya Arimoto; Kikuo Muramatsu, all of Itami, Japan

[73] Assignee: Mitsubishi Denki Kabushiki Kaisha

[21] Appl. No.: 08/612,054

[22] Filed: Mar. 7, 1996

Related U.S. Application Data

[62] Division of application No. 08/034,324, Mar. 22, 1993, Pat. No. 5,659,548.

[30] Foreign Application Priority Data

Mar. 25, 1992 [JP] Japan .................................. 4-67092

[51] Int. Cl.[7] .................................................. G01R 31/28
[52] U.S. Cl. .......................... 370/212; 370/463; 370/468; 370/527; 375/238; 340/825.63
[58] Field of Search ..................... 370/212, 463, 370/527, 431, 249, 468; 375/238, 257, 377; 340/825.63

[56] References Cited

U.S. PATENT DOCUMENTS

| 4,710,918 | 12/1987 | Miyao | 370/445 |
|---|---|---|---|
| 5,012,404 | 4/1991 | Pressprich | 364/200 |
| 5,272,705 | 12/1993 | Okamoto | 371/20.5 |
| 5,293,571 | 3/1994 | Matsuda et al. | 370/505 |
| 5,357,525 | 10/1994 | Moriue et al. | 370/360 |
| 5,369,784 | 11/1994 | Nelson | 370/350 |

FOREIGN PATENT DOCUMENTS

| A-0 125 095 | 11/1984 | European Pat. Off. | H04L 12/40 |
|---|---|---|---|
| 0 217 571 | 4/1987 | European Pat. Off. | H04L 11/16 |
| 0 237 839 | 9/1997 | European Pat. Off. | G06F 13/36 |
| 51-113525 | 10/1976 | Japan | H04B 1/00 |
| 3-85039 | 4/1991 | Japan | H04L 11/00 |

*Primary Examiner*—Hassan Kizou
*Assistant Examiner*—Seema S. Rao
*Attorney, Agent, or Firm*—Townsend and Townsend and Crew LLP

[57] ABSTRACT

A communication control apparatus, provided with an echo back comparison detecting unit (30) detecting something abnormal of communication data from itself or an abnormal state generated at a data line (4), by starting transmission of communication data from itself following a detection of a line state detecting unit (29), when the line state detecting unit (29) detects that transmission of communication data from another communication apparatus to a data line (4) is started in a transmission permissible section, and by taking in communication data at the data line (4) and by comparing it with communication data having been transmitted from itself, and further provided with a transmission mark generating unit (23) shortening a bit width of data indicating a start of communication data transmitted from itself, prevents an abnormal waveform from being transmitted to the data line (4) because accuracy of echo back comparison is improved and delay tolerance of the data line (4) is eased.

5 Claims, 22 Drawing Sheets

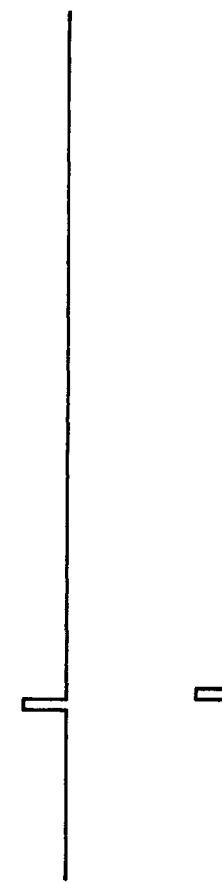
Fig. 4(a) Prior Art
TRANSMITTING BUFFER FULL SIGNAL 32
Fig. 4(b) Prior Art
TRANSMISSION ALLOWING FLAG 33
Fig. 4(c) Prior Art
TRANSMISSION START FLAG 34
Fig. 4(d) Prior Art
TRANSMISSION START MARK SOM 35
Fig. 4(e) Prior Art
P TO S LOAD SIGNAL 37

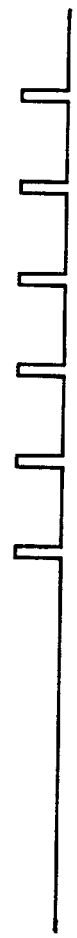
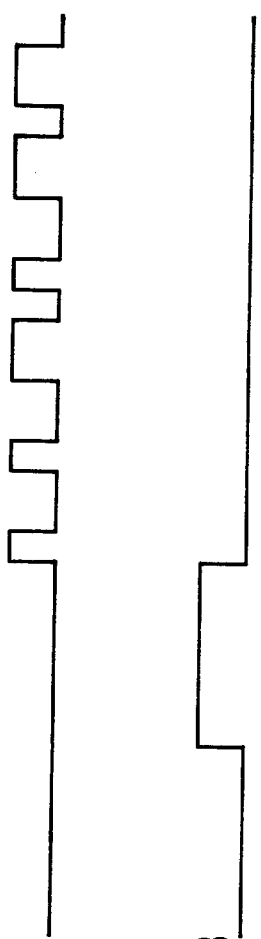
Fig. 4(f)
Prior Art
P TO S SHIFT CLOCK 39
Fig. 4(g)
Prior Art
P TO S SHIFT REGISTER
HIGHEST OUTPUT DATA 40
Fig. 4(h)
Prior Art
ECHO BACK COMPARING
REGISTER OUTPUT 41
Fig. 4(i)
Prior Art
PWM OUTPUT 42
Fig. 4(j)
Prior Art
SELECTOR CONTROL SIGNAL 38

Fig.5(k)
Prior Art
SELECTOR OUTPUT 43

Fig.5(l)
Prior Art
WAVEFORM AT COMMON DATA LINE 44

Fig.5(m)
Prior Art
DIGITAL FILTERING SAMPLING CLOCK 45

Fig.5(n)
Prior Art
DIGITAL FILTER OUTPUT 46

Fig.5(o)
Prior Art
PWDM SAMPLING CLOCK 47

Fig.5(p)
Prior Art
PWDM OUTPUT 48

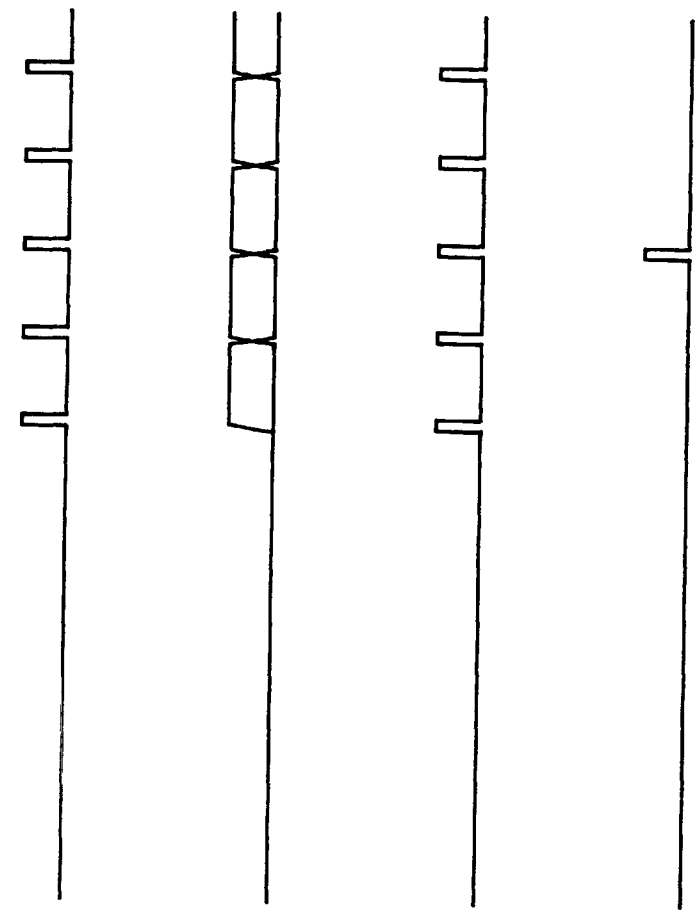
Fig. 5(q) Prior Art ECHO BACK COMPARING CLOCK 52
Fig. 5(r) Prior Art ECHO BACK COMPARISON DETECTING DATA 53
Fig. 5(s) Prior Art STOP SHIFT CLOCK 49
Fig. 5(t) Prior Art TRANSMISSION STOP SIGNAL 54

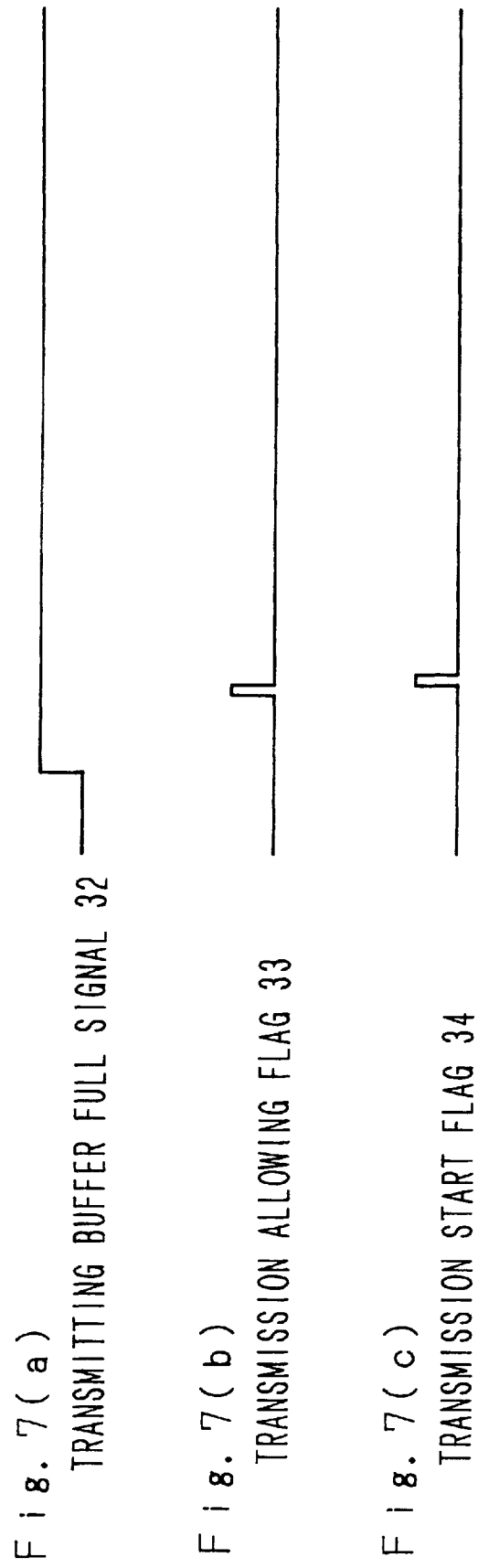

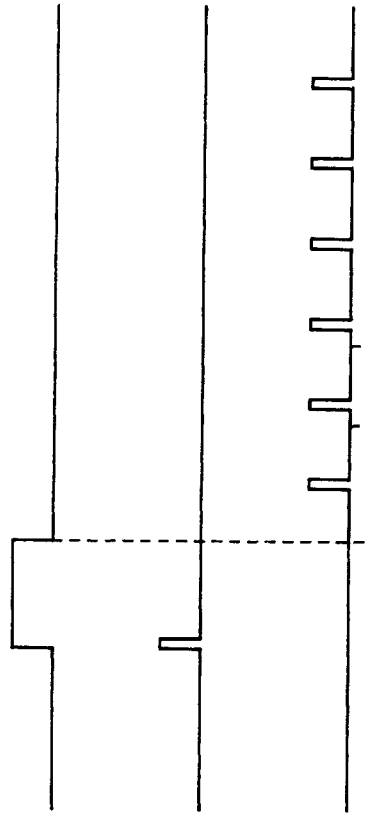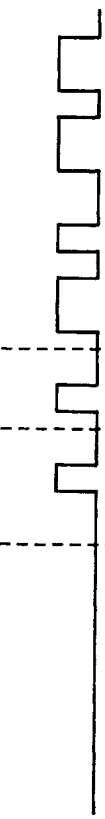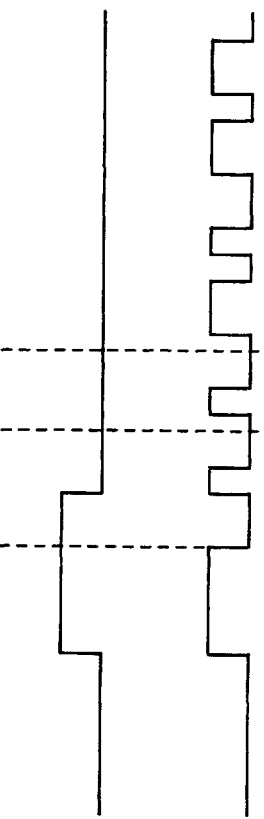
Fig. 7(d) TRANSMISSION START MARK 35 (SOM)
Fig. 7(e) P TO S LOAD SIGNAL 37
Fig. 7(f) P TO S SHIFT CLOCK 39
Fig. 7(g) P TO S SHIFT REGISTER HIGHEST OUTPUT DATA 40
Fig. 7(h) PWM OUTPUT 42
Fig. 7(i) SELECTOR CONTROL SIGNAL 38
Fig. 7(j) SELECTOR OUTPUT 43

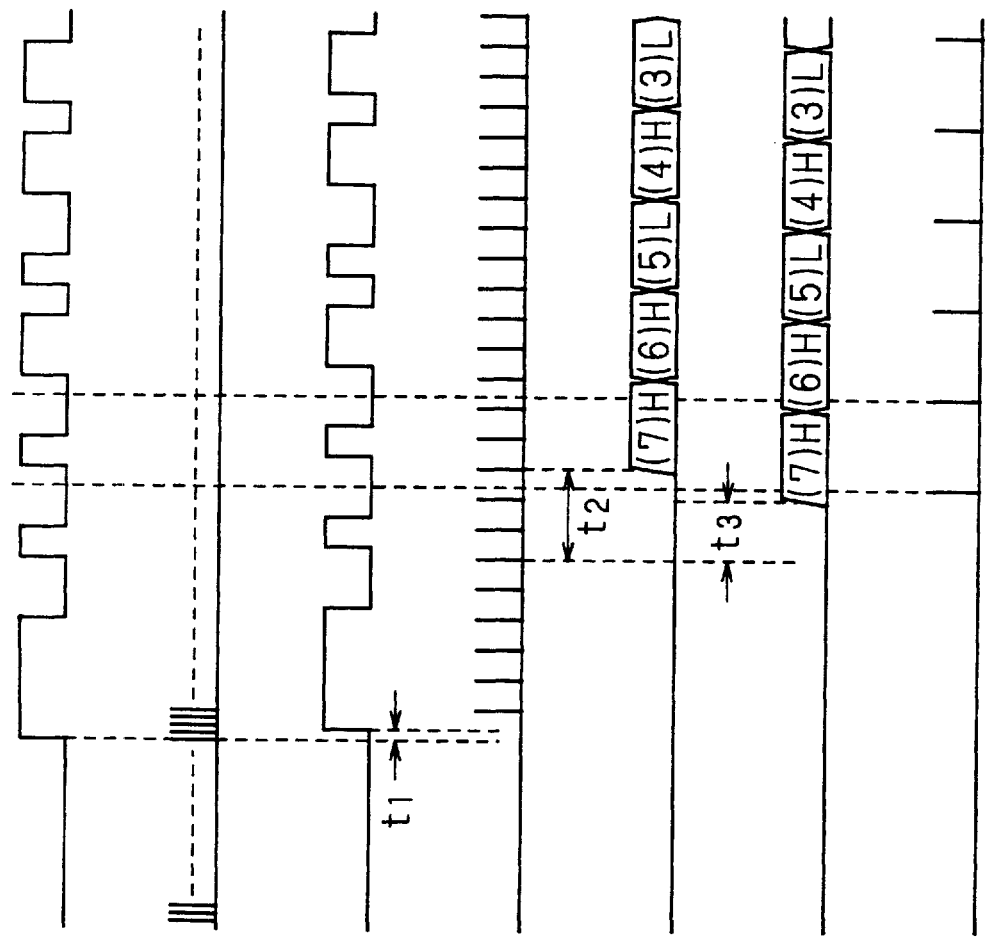

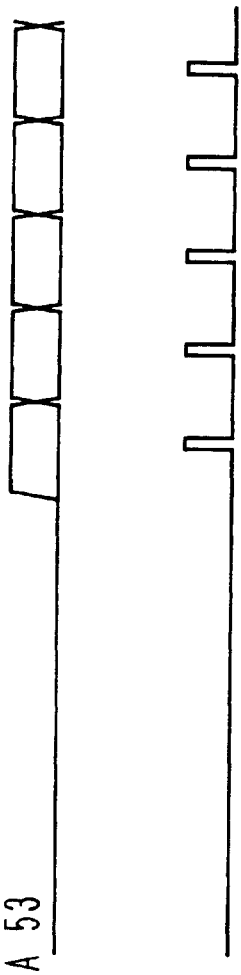
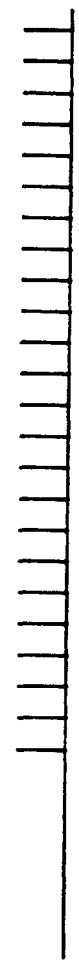
Fig. 8 (r) ECHO BACK COMPARING DETECTING DATA 53
Fig. 8 (s) STOP SHIFT CLOCK 49
Fig. 8 (t) TRANSMIT DATA ABNORMALITY DETECTING CLOCK 59
Fig. 8 (u) TRANSMIT DATA ABNORMALITY DETECTION FLAG 60
Fig. 8 (v) TRANSMISSION STOP SIGNAL 54

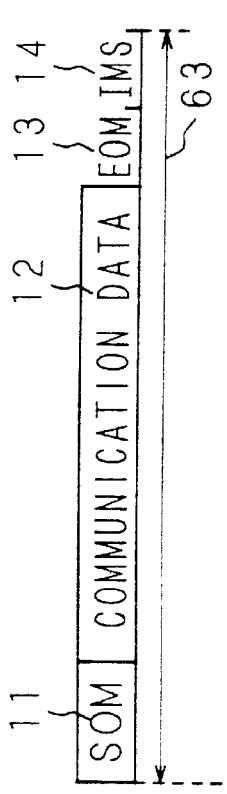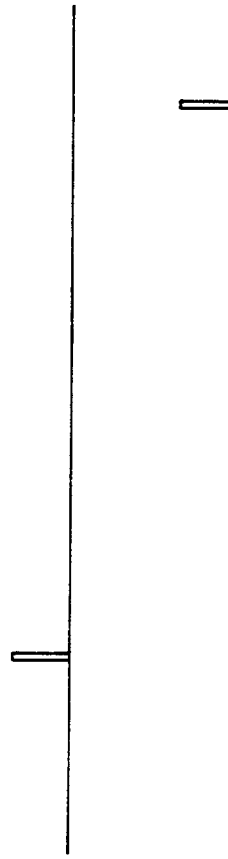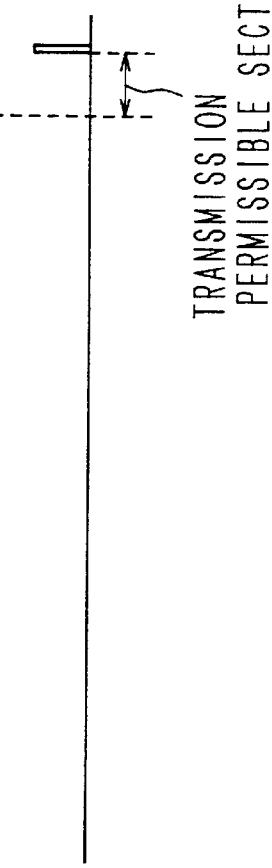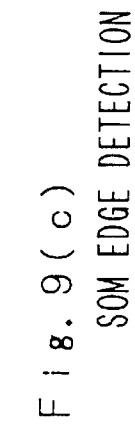

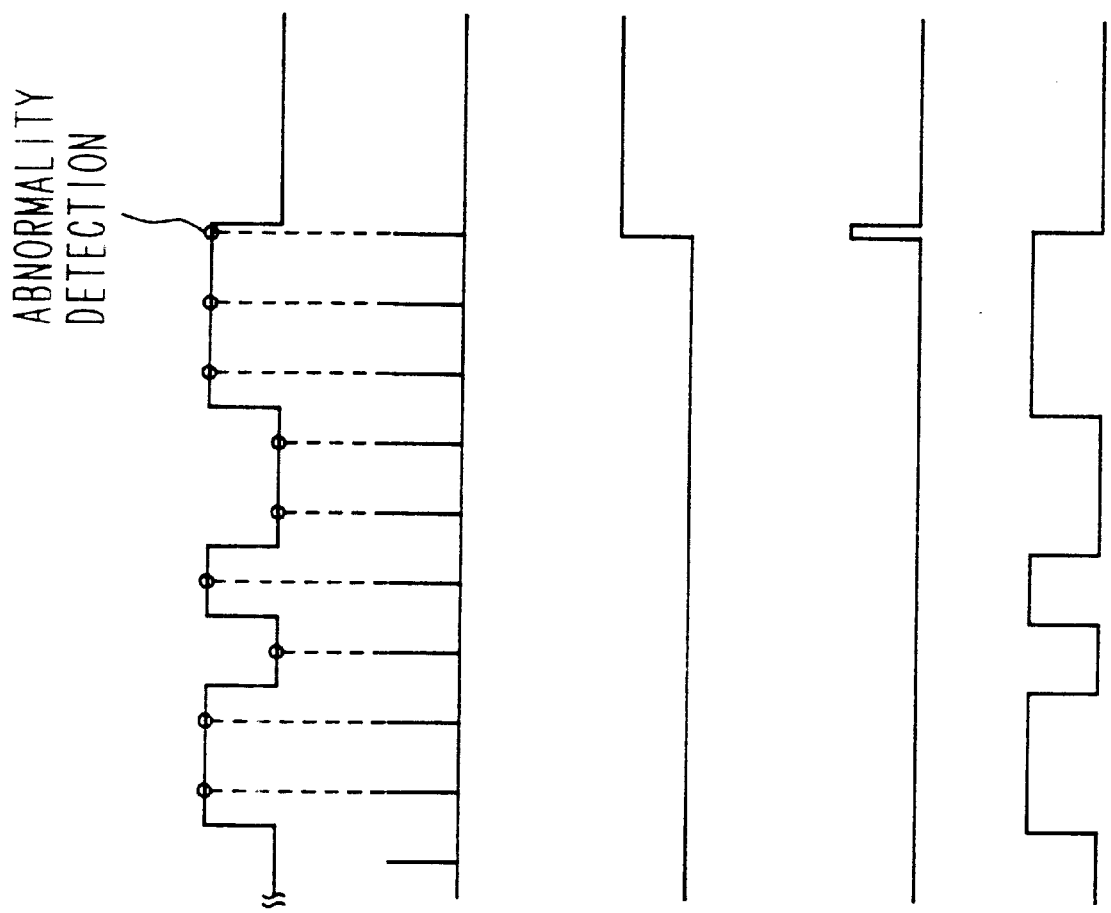
Fig. 10(a) TRANSMIT DATA 64
Fig. 10(b) TRANSMIT DATA ABNORMALITY DETECTING CLOCK 59
Fig. 10(c) TRANSMIT DATA ABNORMALITY DETECTION FLAG 60
Fig. 10(d) TRANSMISSION STOP SIGNAL 54
Fig. 10(e) WAVEFORM AT COMMON DATA LINE 44

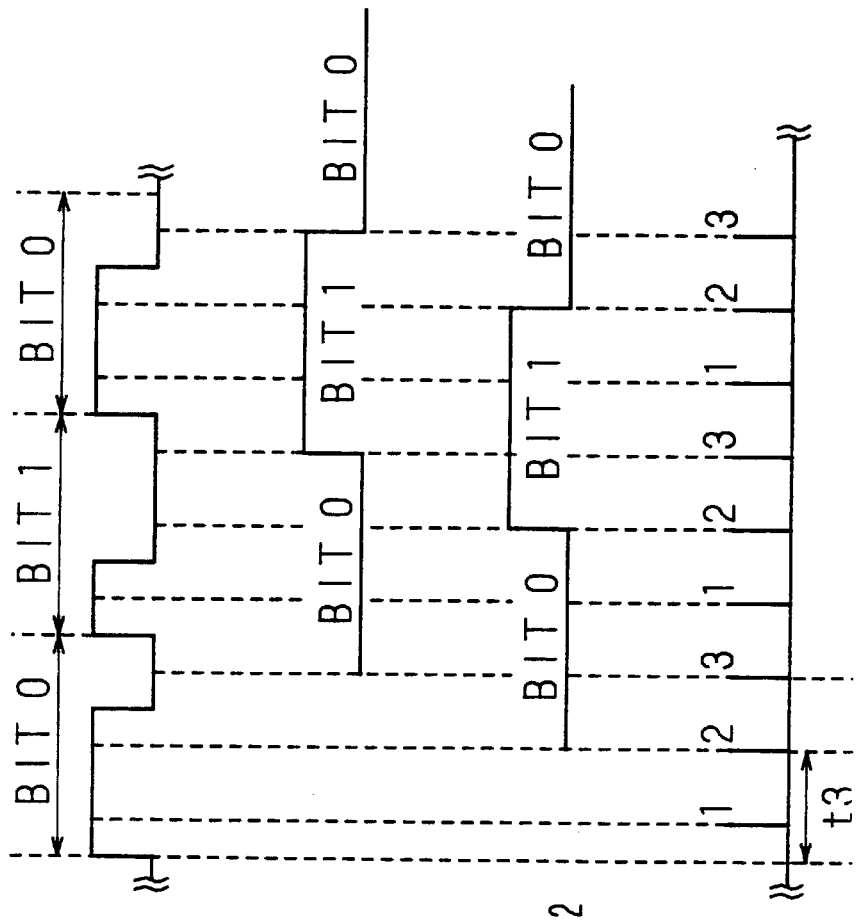

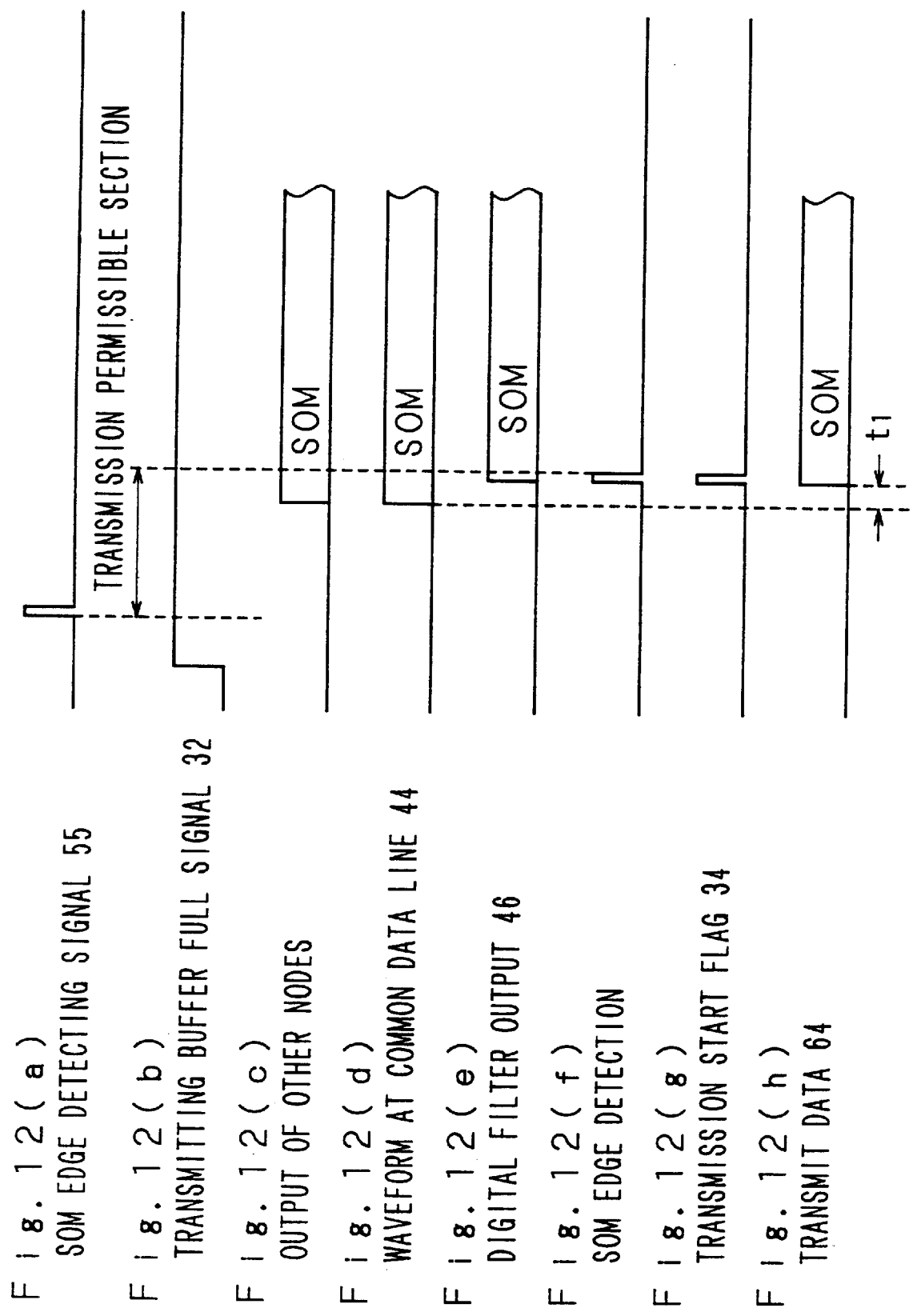

Fig. 13(a) EOM DETECTION FLAG
Fig. 13(b) OUTPUT OF OTHER NODES
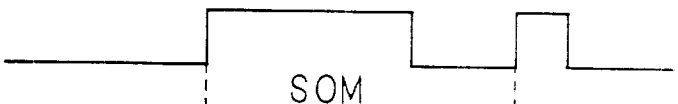
Fig. 13(c) WAVEFORM AT COMMON DATA LINE 44
Fig. 13(d) DIGITAL FILTER OUTPUT 46
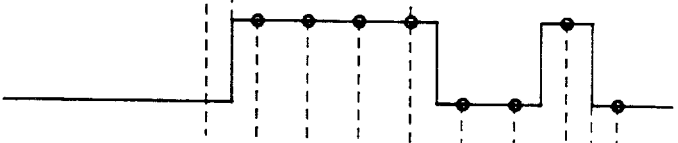
Fig. 13(e) SOM EDGE DETECTION
Fig. 13(f) TRANSMISSION START FLAG 34
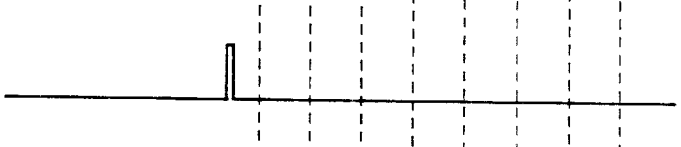
Fig. 13(g) TRANSMIT DATA 64
Fig. 13(h) FOLLOWING START DETECTION FLAG 71
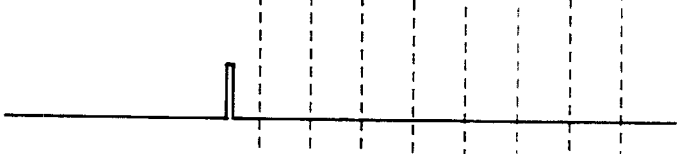
Fig. 13(i) PWDM SAMPLING CLOCK 47
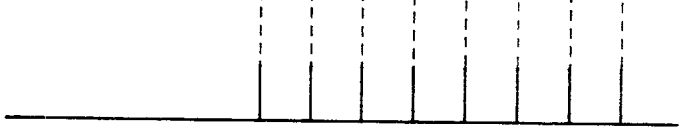
Fig. 13(j) USUAL SOM OUTPUT
Fig. 13(k) SOM OUTPUT AT FOLLOWING START
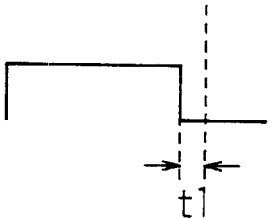

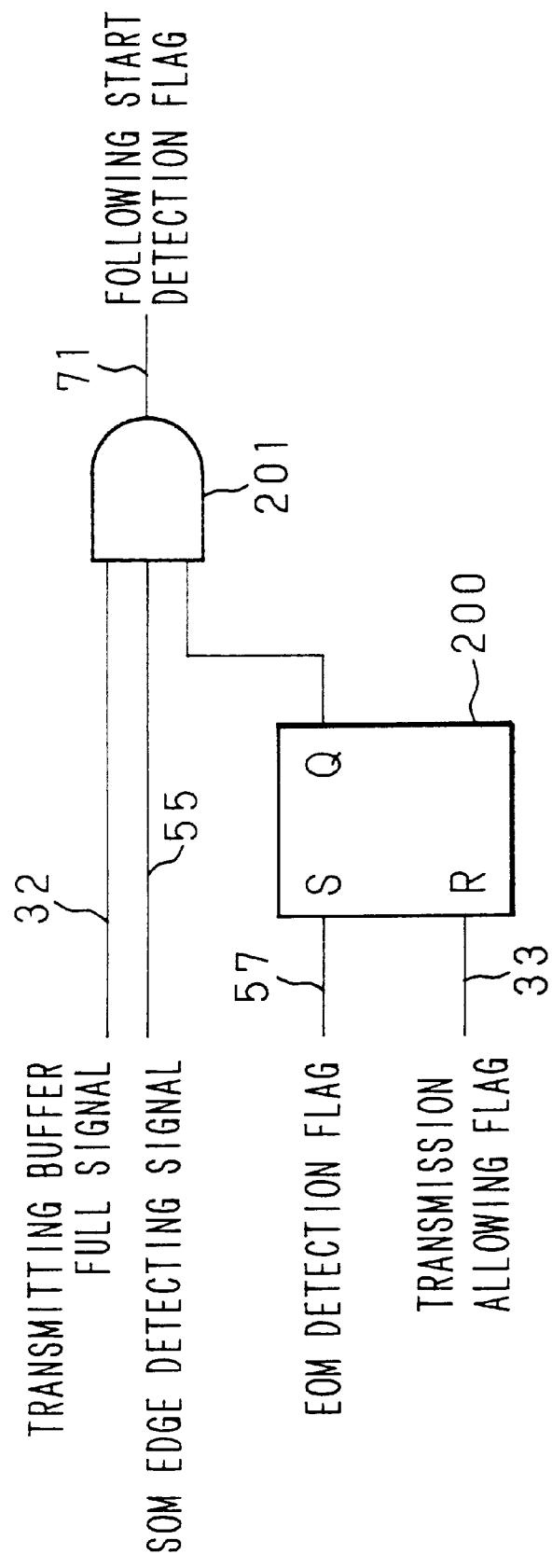

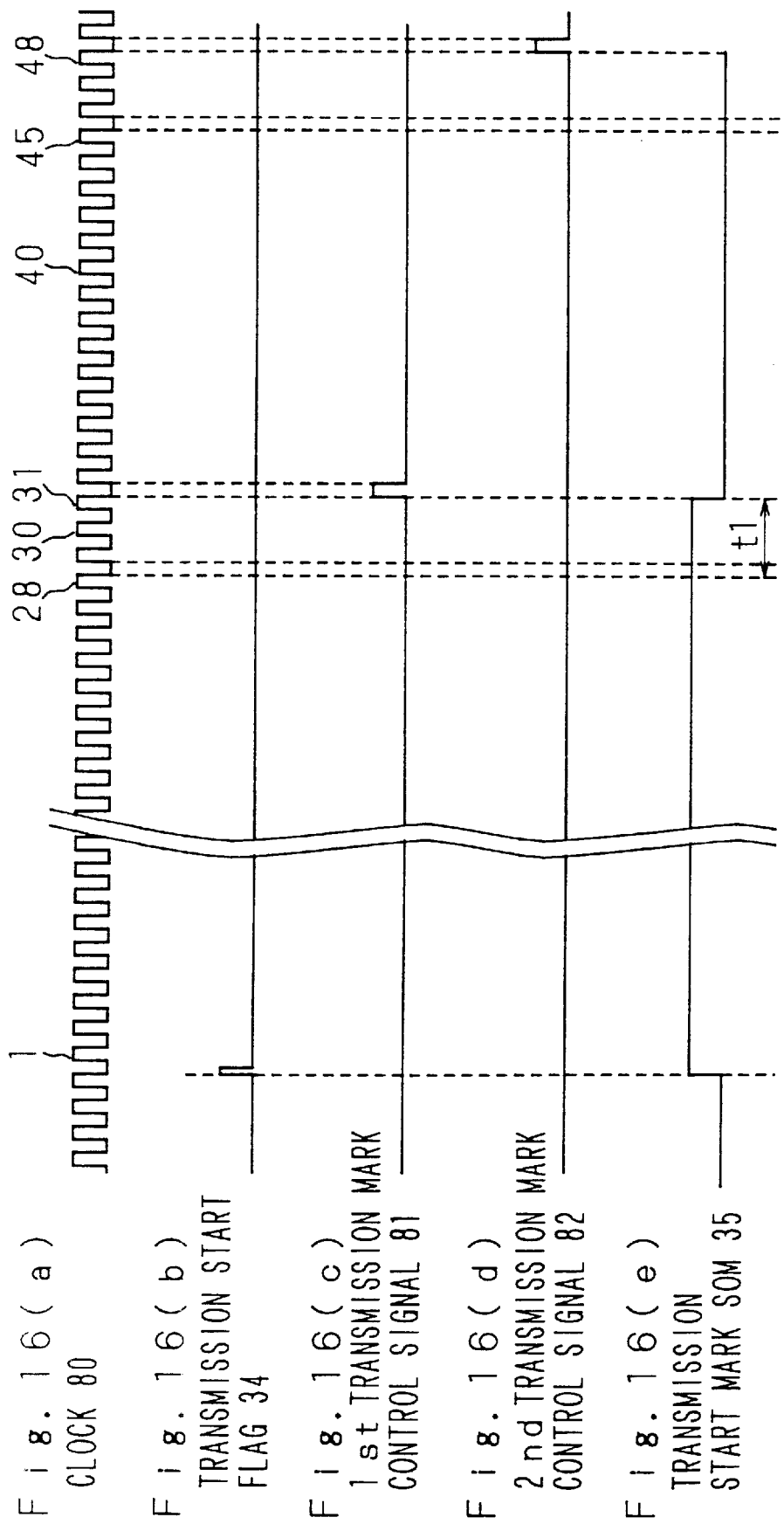

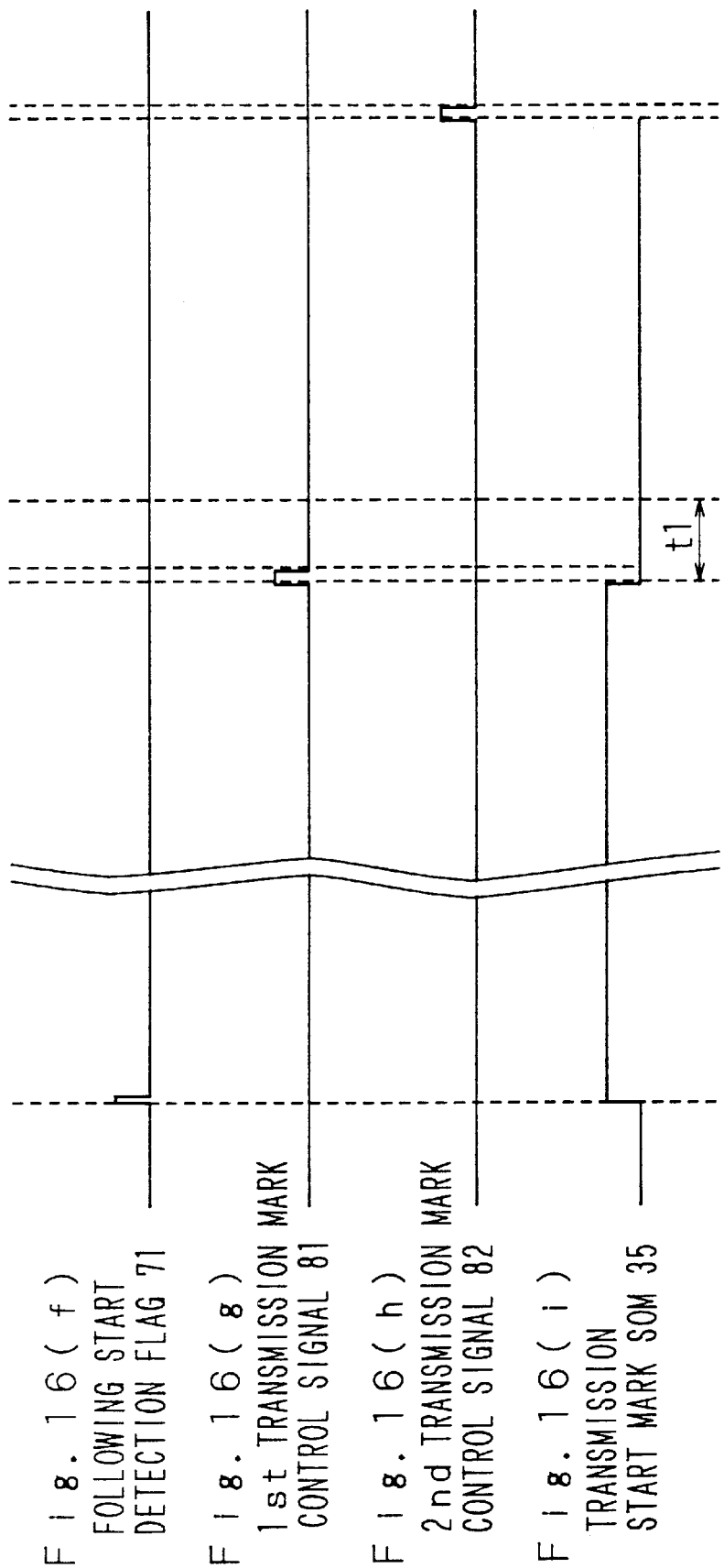

EOM DETECTION FLAG

OUTPUT OF OTHER NODES

WAVEFORM AT COMMON
DATA LINE 44

DIGITAL FILTER
OUTPUT 46

SOM EDGE DETECTION

TRANSMISSION START
FLAG 34

TRANSMIT DATA 64

PWDM SAMPLING
CLOCK 47

COMMUNICATION CONTROL APPARATUS

This is a Division of application No. 08/034,324 filed Mar. 22, 1993 which is now U.S. Pat. No. 5,659,548.

BACKGROUND OF THE INVENTION

1. Field of the Invention

The present invention relates to a communication control apparatus performing data communication control.

2. Description of Related Art

Before an explanation on a conventional art, at first explanation will be made on a general connecting state of nodes with respect to a common line in a communication system and on a waveform pattern used in general data communication, referring to FIG. 1 and FIG. 2.

FIG. 1 is a schematic diagram showing a configuration example of a general communication system in which a plurality of nodes are connected to a common data line. In FIG. 1, reference characters 1a, 1b and 1c respectively designate a first node, second node and third node. Each of the nodes 1a, 1b, and 1c is composed of a communication control apparatus having communication control function and a microcomputer, not shown however. Each of the nodes 1a, 1b and 1c is connected to the common data line 4 respectively through transmitting buffer 2a, 2b and 2c, and through receiving buffer 3a, 3b and 3c.

In such a configuration of a communication system as shown in FIG. 1, in the case, for example, where the first node 1a transmits data to the third node 1c, the first node 1a delivers data to the common data line 4 through the transmitting buffer 2a. The data delivered from the first node 1a to the common data line 4 is inputted to the third node 1c and, at the same time, is inputted again to the first node 1a from which the data has been delivered, and further, in this case, is inputted also to the irrelevant second node 1b through the receiving buffer 3b. In addition, such a method that a node itself which has delivered data receives the data again is called echo back and the data received again is called echo back data.

By the way, in the data to be delivered to the common data line 4, data showing an object node of transmission, that is, a node which should receive the data (in this case, the third node 1c) is included. According to the data showing the object node of transmission, the second node 1b judges that it is not the data transmitted to itself and does not perform receiving operation, and the third node 1c judges that it is the data transmitted to itself and performs receiving operation.

And in case of the communication system shown in FIG. 1, CSMA/CD (Carrier Sense Multiple Access/Collision Detection) method is used as a bus competition control method. As for a bus occupation right of the common data line 4 in the case, for example, where the first node 1a and the second node 1b start transmitting at the same time, a node of high priority can occupy a bus by comparing echo back data with data transmitted from the node itself (in the following, to be called echo back comparison).

Next, explanation will be made on bit pattern of data communication used both in prior art and in the present invention, referring to FIG. 2.

FIG. 2 is a waveform diagram showing an example of bit pattern having been performed Pulse Width Modulation (in the following, to be called PWM), and the waveform transmitted to the common data line 4 shown in the aforesaid FIG. 1 is stipulated by the bit pattern explained in the following.

In FIG. 2, one bit region of data is composed of three divided areas (in the following, each of them called a time). As shown in FIG. 2. (a), bit "1" is represented by a first time being "H" (high level) and by a second and a third times both being "L" (low level). And as shown in FIG. 2 (b), bit "0" is represented by the first time and second time both being "H" and by the third time being "L". Transmit data configures each bit of communication data according to such bit pattern as "1" or "0" and to the positions before and behind it, a mark SOM (Start of Message) meaning transmission starting as shown in FIG. 2 (c), a mark EOM (End of Message) meaning transmission ending as shown in FIG. 2 (d) and a mark IMS (Inter Message Separation) meaning allowing the next transmission as shown in FIG. 2 (e) are added.

In addition, SOM has a pattern in which all of the first through the fourth times have "H" and both the fifth and sixth times have "L", being composed of six times of the sum, EOM has a pattern in which all of the first through the six times have "L", being composed of six times of the sum, and IMS has a pattern in which all of the first through the third have "L", being composed of three times of the sum.

Next, explanation will be made on the configuration of the conventional example of the communication control apparatus, referring to FIG. 3.

FIG. 3 is a block diagram showing essential parts of the conventional communication apparatus, that is, parts where transmitting and receiving are performed, and, more specifically, is a block diagram showing parts conducting interfacing with respect to the common data line 4.

As shown in the block diagram of FIG. 3, the essential parts of the conventional communication control apparatus 1 is composed of a transmitting unit designated by reference numeral 17, a receiving unit designated by 18, and, as the others, a sequence control unit 19, a line state detecting unit 29, an echo back comparison detecting unit 30, an echo back comparing register 30 and the like.

The transmitting unit 17 is composed of a transmitting buffer memory 20, a P to S (Parallel to Serial) shift register 21, a PWM unit 22, a transmission mark generating unit 23, a selector 24, a transmitting buffer 2 and the like. In the transmitting buffer memory 20, data to be transmitted is stored. The data train stored in this transmitting buffer memory 20 as parallel data is converted into serial data by the P to S shift register 21. The serial data converted by the P to S shift register 21 is pulse-width modulated by the PWM unit 22. The transmission mark generating unit 23 generates SOM aforementioned. Either of the SOM pattern generated by this transmission mark generating unit 23 or the bit pattern modulated by the PWM unit 22 is selected by the selector 24 and outputted from the transmitting buffer 2 to the common data line 4.

And the receiving unit 18 is composed of a receiving buffer 3, a digital filter 25, a PWDM (Pulse Width Demodulation) unit 26, an S to P (Serial to Parallel) shift register 27, a receiving buffer memory 28 and the like. The communication data at the common data line 4 is removed of noise component by a digital filter 25 connected through the receiving buffer 3, and is pulse-width demodulated by the PWDM unit. 26. Since the data having been pulse-width demodulated by the PWDM unit 26 is serial data, it is converted into parallel data by the S to P shift register 27 and is written into the receiving buffer memory 28.

And at the outside of the transmitting unit 17 and the receiving unit 18, a sequence control unit 19, a line state detecting unit 29 connected with the output of the digital filter 25 so as to observe a state of receive data, an echo back comparing register 30 and an echo back comparison detecting unit 61 which are used for echo back comparison, are provided. A comparison output of the echo back comparison detecting unit 30 and a detection data output of the line state detecting unit 29 are inputted in the sequence control unit 19.

Next, explanation will be made on the operation of the communication control apparatus of the conventional example whose configuration is shown in FIG. 3 aforementioned, referring to FIG. 3, FIG. 4 and FIG. 5.

FIG. 4 and FIG. 5 are timing charts explanatory of operations of the transmitting unit 17, receiving unit 18 and the echo back comparison detecting unit 30 and sequence control unit 19.

At first, at the time when data to be transmitted is written in the transmitting buffer memory 20, a transmitting buffer full signal 32 shown in FIG. 4 (a) rises to become "H" level so as to be inputted to the sequence control unit 19. And in the case where the state of the common data line 4 detected by the line state detecting unit 29 is coincided with IMS shown in FIG. 2 (e) aforementioned, a transmission allowing flag 33 is generated as shown in FIG. 4 (b) so as to be inputted in the sequence control unit 19. The sequence control unit 19 generates a transmission start flag 34 showing transmission starting shown in FIG. 4 (c) corresponding to the fact that the transmitting buffer full signal 32 aforementioned is inputted therein and to the transmission allowing flag 33. According to the generation of the transmission start flag 34, all of the configuration elements of the transmitting unit 17 are actuated.

A transmission start mark (SOM), depicted in FIG. 4 (d) and generated by the transmission mark generating unit, is provided to one input of the selector 24 and one byte of a transmission data train 40, selected by an address 36 provided to the to the transmitting buffer memory and transferred to the P to S shift register 25 in response to P to S load signal 24, is provided to other input of the selector 24. At this time, since the selector 24 selects the SOM 35 outputted from the transmission mark generating unit 23 by a selector control signal 38 given from the sequence control unit 19 shown in FIG. 4 (j), the SOM 35 is delivered to the common data line 4 through the transmitting buffer 2. After the SOM 35 is delivered to the common data line 4, the selector 24 selects an output (PWM output) 42 of the PWM unit 22 shown in FIG. 4 (i) by the selector control signal 38. At this time point, a P to S shift clock 39 shown in FIG. 4 (f) is inputted in the P to S shift register 21. The P to S shift register 21 performs shift operation with the rising to "H" level of the P to S shift clock 39 as trigger, and the highest output bit data (7) in the transmission data train of one byte which has been taken in is outputted at the timing shown in FIG. 4 (g).

In the following, the P to S shift register 21 outputs output bit data being from the second output bit data (6) to the lowest output bit data (0) of one-byte transmission data train 40 successively as serial data. Since the P to S shift clock 39 is inputted in the same way also in the echo back comparing register 31, an echo back comparing register output 41 is generated at the timing shown in FIG. 4 (h).

On the other hand, the serial output data bit of the P to S shift register 21 inputted to the PWM unit 22 is pulse-width modulated successively by the PWM unit 22 so as to be outputted as the PWM output 42 as shown in FIG. 4 (i) to the selector 24. At this time, as aforementioned, since the selector 24 selects the PWM output 42, the PWM output 42, as a selector output 43 shown in FIG. 5 (k), is delivered to the common data line 4 through the transmitting buffer 2, a waveform 44 at the common data line 4 is to be the one as shown in FIG. 5 (l).

Next, explanation will be made on the operation of the receiving unit 18. The waveform at the common data line 4 is transmitted to the digital filter 25 through the receiving buffer 3. The digital filter 25 outputs a digital filter output 46 as shown in FIG. 5 (n) obtained by a filtering process modulated serial data on the basis of a digital filtering sampling clock 45 shown in FIG. 5 (m), so as to input it in the PWDM unit 26. At this time, as shown in FIG. 5 (n), since time t1 is required for filtering process, a digital filter output 46 is delayed by time t1, with respect to the waveform 44 at the common data line 4.

And the PWDM unit 26 outputs a PWDM output 48 shown in FIG. 5 (p) to the S to P shift register 27 as demodulated serial data obtained by pulse-width demodulating the digital filter output 46, on the basis of "H" level pulse of a PWDM sampling clock 47 shown in FIG. 5 (o). Time t2 required for demodulating process shown in FIG. 5 (p) is to be delay time of output timing of the PWDM output 48 which is demodulated serial data with respect to output timing of the digital filter output 46.

Next, by the fact that the S to P shift register 27 is given a shift clock 49 shown in FIG. 5 (s), data which has been pulse-width demodulated is taken in the S to P shift register 27 successively. At the time when eight-bit data is taken in the S to P shift register 27, a pulse 50 which opens a receiving buffer writing gate (not shown in FIG. 3) is given, and parallel data for one byte is written in the receiving buffer memory 28 corresponding to a receiving buffer address 51. In the following, according to the same operation, receive data train is stored successively in the receiving buffer memory 28.

On the other hand, in the echo back comparison detecting unit 30, as shown in FIG. 4 (h), the echo back comparing resister output 41 and the PWDM output 48 are compared with each other on the basis of an echo back comparing clock 52 shown in FIG. 5 (q). As a result to this comparison, a logical "H" signal is output from the echo back comparison detecting unit 30 when the output of the echo back comparing register 30 and PWDM Unit are the same and a logical "L" is output when they are not the same. The sequence control unit 19 which has received the echo back comparison detecting data 53 outputs a transmission stop signal 54 shown in FIG. 5 (t) having a meaning of stopping transmission, in the case where it receives "H" signal. At the time when this transmission stop signal 54 is outputted from the sequence control unit 19, a reset signal not shown is inputted in the transmitting unit 17 and transmission operation is finished.

In the conventional communication control apparatus having such an echo back comparing function as aforementioned, echo back accuracy is dependent upon the delay time t1, of the digital filter 25 until serial data transmitted from the transmitting unit 17 is received by the receiving unit 18 or on the delay time t2 required for demodulating pulse width by the PWDM unit 26. That is to say, there has been a problem that a tolerance of delay is reduced at a load resistance or load capacity connected to the common data line 4.

And since the essence of echo back comparing is to judge whether or not receive data is coincided with the transmit data of "itself", abnormality can't be detected so long as transmit data is coincided with receive data even in the case where output data has something abnormal according to an accident of the transmitting unit 17 of itself, and transmission is continued as it is. Therefore, abnormal waveforms are continuously delivered to the common data line 4, resulting in giving bad effect to the whole transmission system or the like.

SUMMARY OF THE INVENTION

The present invention has been devised in order to solve such a problem as aforementioned, and the object thereof is to provide a communication control apparatus capable of preventing transmitting of abnormal waveforms to the common data line by relieving delay tolerance of the common data line.

The communication control apparatus of the present invention includes a line state detecting unit, which detects when another apparatus starts transmitting data on a common data line during a transmission permissible section, and an echo back comparison means. The communication control apparatus starts transmitting its own data during the detected transmission permissible section and compares the data it transmits to the data on the common data line to detect an abnormality in the data it is transmitting or an abnormal state generated by the data line. There is further included a system for shortening the bit width of the starting data of the data it transmits on the common data line.

And the communication control apparatus of the present invention is provided with means for performing the so called echo back comparison abovementioned, means for pulse-width modulating at the time when communication data is transmitted, first pulse-width demodulating means for pulse-width demodulating so as to demodulate pulse-width modulated data which has been received to be communication data, and with second pulse-width demodulating means for pulse-width demodulating as means for echo back comparing.

Further, in the communication control apparatus of the invention, the pulse-width demodulating means for echo back comparing is so configured that pulse-width demodulating is performed only in two sections at the head side in data sorted into three sections per one bit pattern.

And further, the communication control apparatus of the present invention includes, in addition to the above-described echo back comparison system, a transmit abnormality detecting system for detecting whether there is abnormality in its own data prior transmitting its own data on the common data line and a system for stopping the transmission of its own data if an abnormality is detected by the transmit abnormality detecting system or the above-described echo back comparison system.

In the communication control apparatus of the invention, since phase difference, generated in the case where it transmits communication data following communication data transmitted to the data line from the other communication apparatus, is dissolved and the signal at the data line in which this phase difference has been dissolved is performed echo back comparison as the echo back data, echo back comparison accuracy is improved.

And since it is also provided with the PWDM unit exclusively used for the echo back comparing means, the echo back comparing means immediately performs echo back comparison when echo back data is inputted.

Further, echo back comparison timing is made faster by the fact that serial data to be pulse-width demodulated at the PWDM unit for echo back comparing is converted by two clocks of sampling clock according to a function of the invention. Accordingly, the response of the echo back comparison system is made faster and the transmission of data from the communication control apparatus can be stopped faster.

And further, an abnormality in a bit pattern to transmitted by the communication control apparatus is detected by its transmit data abnormality detecting unit before it is transmitted to the common data line and, if an abnormality is detected, transmitting from the communication control apparatus is stopped.

BRIEF DESCRIPTION OF THE DRAWINGS

FIG. 14 is a circuit diagram showing a circuit configuration for detecting a following start detection flag of the communication control apparatus of the invention.

DESCRIPTION OF THE PREFERRED EMBODIMENTS

In the following, description will be made on the invention referring to drawings showing the embodiments thereof.

Figure 6:
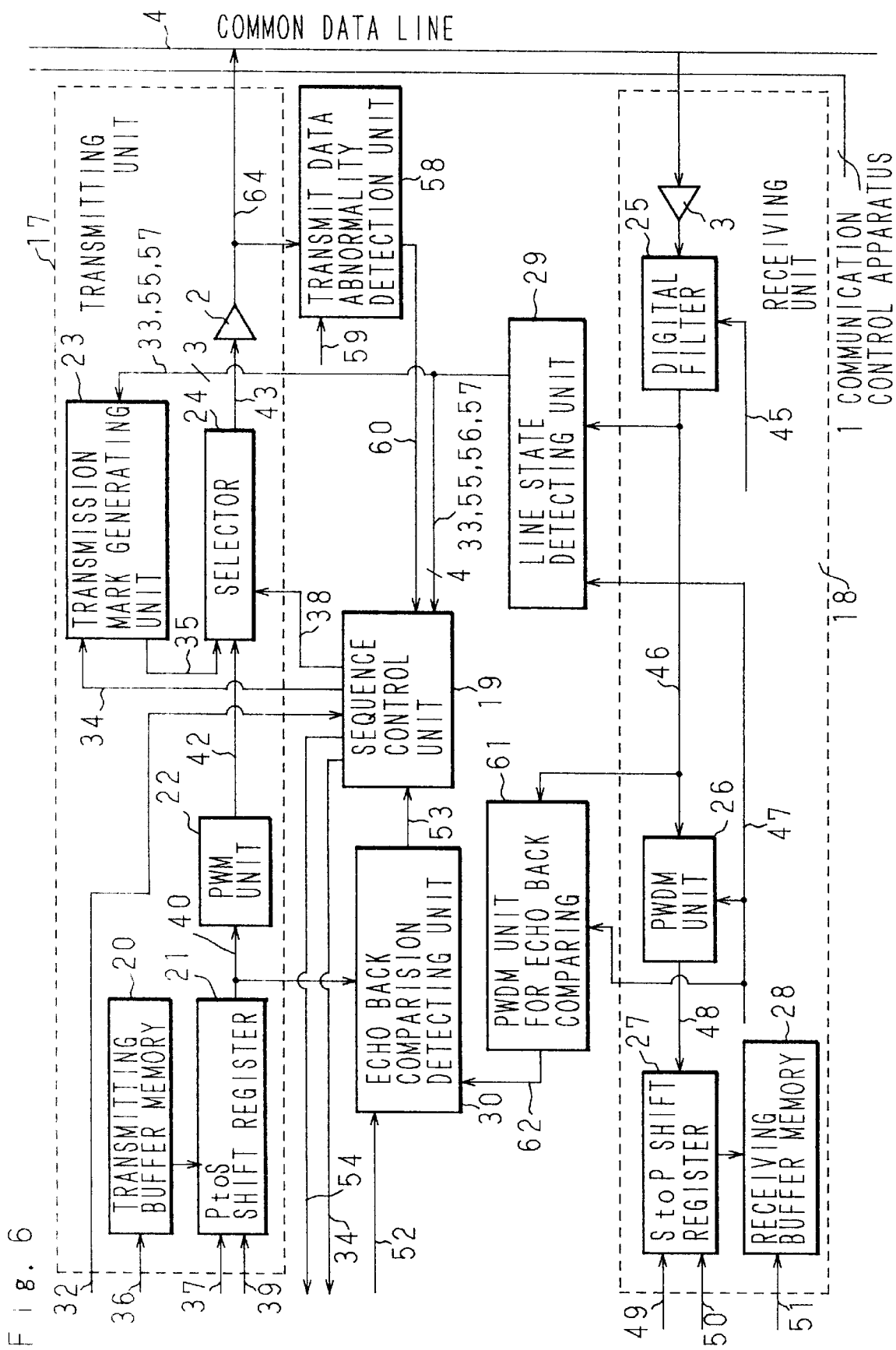
FIG. 6 is a block diagram showing a configuration of essential parts of a communication apparatus of the invention, FIG. 7 (a) is a waveform of transmitting buffer full signal in timing chart showing operation states of the transmitting unit, receiving unit, and echo back comparison detecting unit, transmit data abnormality detecting unit, and sequence control unit of the communication control apparatus of the invention, FIG. 7 (b) is a waveform of transmission allowing flag in timing chart showing operation states of the transmitting unit, receiving unit, and echo back comparison detecting unit, transmit data abnormality detecting unit, and sequence control unit of the communication control apparatus of the invention, FIG. 7 (c) is a waveform of transmission start flag in timing chart showing operation states of the transmitting unit, receiving unit, and echo back comparison detecting unit, transmit data abnormality detecting unit, and sequence control unit of the communication control apparatus of the invention, FIG. 7 (d) is a waveform of transmission start mark (SOM) in timing chart showing operation states of the transmitting unit, receiving unit, and echo back comparison detecting unit, transmit data abnormality detecting unit, and sequence control unit of the communication control apparatus of the invention, FIG. 7 (e) is a waveform of P to S load signal in timing chart showing operation states of the transmitting unit, receiving unit, and echo back comparison detecting unit, transmit data abnormality detecting unit, and sequence control unit of the communication control apparatus of the invention, FIG. 7 (f) is a waveform of P to S shift clock in timing chart showing operation states of the transmitting unit, receiving unit, and echo back comparison detecting unit, transmit data abnormality detecting unit, and sequence control unit of the communication control apparatus of the invention, FIG. 7 (g) is a waveform of P to S shift register highest output data in timing chart showing operation states of the transmitting unit, receiving unit, and echo back comparison detecting unit, transmit data abnormality detecting unit, and sequence control unit of the communication control apparatus of the invention, FIG. 7 (h) is a waveform of PWM output in timing chart showing operation states of the transmitting unit, receiving unit, and echo back comparison detecting unit, transmit data abnormality detecting unit, and sequence control unit of the communication control apparatus of the invention, FIG. 7 (i) is a waveform of selector control signal in timing chart showing operation states of the transmitting unit, receiving unit, and echo back comparison detecting unit, transmit data abnormality detecting unit, and sequence control unit of the communication control apparatus of the invention, FIG. 7 (j) is a waveform of selector output in timing chart showing operation states of the transmitting unit, receiving unit, and echo back comparison detecting unit, transmit data abnormality detecting unit, and sequence control unit of the communication control apparatus of the invention, FIG. 8 (k) is a waveform at common data line in timing chart showing operation states of the transmitting unit, receiving unit, and echo back comparison detecting unit, transmit data abnormality detecting unit, and sequence control unit of the communication control apparatus of the invention, FIG. 8 (l) is a waveform of digital filtering sampling clock in timing chart showing operation states of the transmitting unit, receiving unit, and echo back comparison detecting unit, transmit data abnormality detecting unit, and sequence control unit of the communication control apparatus of the invention, FIG. 8 (m) is a waveform of digital filter output in timing chart showing operation states of the transmitting unit, receiving unit, and echo back comparison detecting unit, transmit data abnormality detecting unit, and sequence control unit of the communication control apparatus of the invention, FIG. 8 (n) is a waveform of PWDM sampling clock in timing chart showing operation states of the transmitting unit, receiving unit, and echo back comparison detecting unit, transmit data abnormality detecting unit, and sequence control unit of the communication control apparatus of the invention, FIG. 8 (o) is a waveform of PWDM output in timing chart showing operation states of the transmitting unit, receiving unit, and echo back comparison detecting unit, transmit data abnormality detecting unit, and sequence control unit of the communication control apparatus of the invention, FIG. 8 (p) is a waveform of PWDM output for echo back comparing in timing chart showing operation states of the transmitting unit, receiving unit, and echo back comparison detecting unit, transmit data abnormality detecting unit, and sequence control unit of the communication control apparatus of the invention, FIG. 8 (q) is a waveform of echo back comparing clock in timing chart showing operation states of the transmitting unit, receiving unit, and echo back comparison detecting unit, transmit data abnormality detecting unit, and sequence control unit of the communication control apparatus of the invention, FIG. 8 (r) is a waveform of echo back comparing detecting data in timing chart showing operation states of the transmitting unit, receiving unit, and echo back comparison detecting unit, transmit data abnormality detecting unit, and sequence control unit of the communication control apparatus of the invention, FIG. 8 (s) is a waveform of S to P shift clock in timing chart showing operation states of the transmitting unit, receiving unit, and echo back comparison detecting unit, transmit data abnormality detecting unit, and sequence control unit of the communication control apparatus of the invention, FIG. 8 (t) is a waveform of transmit data abnormality detecting clock in timing chart showing operation states of the transmitting unit, receiving unit, and echo back comparison detecting unit, transmit data abnormality detecting unit, and sequence control unit of the communication control apparatus of the invention, FIG. 8 (u) is a waveform of transmit data abnormality detection flag in timing chart showing operation states of the transmitting unit, receiving unit, and echo back comparison detecting unit, transmit data abnormality detecting unit, and sequence control unit of the communication control apparatus of the invention, FIG. 8 (v) is a waveform of transmission stop signal in timing chart showing operation states of the transmitting unit, receiving unit, and echo back comparison detecting unit, transmit data abnormality detecting unit, and sequence control unit of the communication control apparatus of the invention, FIG. 9 (a) is a waveform at common data line in timing chart explanatory of the operation of the line state detecting unit of the communication control apparatus of the invention, FIG. 9 (b) is a waveform of digital filter output in timing chart explanatory of the operation of the line state detecting unit of the communication control apparatus of the invention, FIG. 9 (c) is a waveform of SOM edge detection in timing chart explanatory of the operation of the line state detecting unit of the communication control apparatus of the invention, FIG. 9 (d) is a waveform of SOM detection flag in timing chart explanatory of the operation of the line state detecting unit of the communication control apparatus of the invention, FIG. 9 (e) is a waveform of EOM detection flag in timing chart explanatory of the operation of the line state detecting unit of the communication control apparatus of the invention, FIG. 9 (f) is a waveform of transmission allowing flag in timing chart explanatory of the operation of the line state detecting unit of the communication control apparatus of the invention, FIG. 10 (a) is a waveform of transmit data in timing chart explanatory of the operation of the transmit data abnormality detecting unit of the communication control apparatus of the invention, FIG. 10 (b) is a waveform of transmit data abnormality detecting clock in timing chart explanatory of the operation of the transmit data abnormality detecting unit of the communication control apparatus of the invention, FIG. 10 (c) is a waveform of transmit data abnormality detection flag in timing chart explanatory of the operation of the transmit data abnormality detecting unit of the communication control apparatus of the invention, FIG. 10 (d) is a waveform of transmission stop signal in timing chart explanatory of the operation of the transmit data abnormality detecting unit of the communication control apparatus of the invention, FIG. 10 (e) is a waveform at common data line in timing chart explanatory of the operation of the transmit data abnormality detecting unit of the communication control apparatus of the invention, FIG. 11 (a) is a waveform of digital filter output in timing chart explanatory of the operation of the PWDM unit and PWDM unit for echo back comparing of the communication control apparatus of the invention, FIG. 11 (b) is a waveform of PWDM output for echo back comparing in timing chart explanatory of the operation of the PWDM unit and PWDM unit for echo back comparing of the communication control apparatus of the invention, FIG. 11 (c) is a waveform of PWDM output for echo back comparing in timing chart explanatory of the operation of the PWDM unit and PWDM unit for echo back comparing of the communication control apparatus of the invention, FIG. 11 (d) is a waveform of PWDM sampling clock in timing chart explanatory of the operation of the PWDM unit and PWDM unit for echo back comparing of the communication control apparatus of the invention, FIG. 12 (a) is a waveform of SOM edge detecting signal in timing chart of another embodiment related to generation of transmission start flag, in the communication control apparatus of the invention, FIG. 12 (b) is a waveform of transmitting buffer full signal in timing chart of another embodiment related to generation of transmission start flag, in the communication control apparatus of the invention, FIG. 12 (c) is a waveform of output of other nodes in timing chart of another embodiment related to generation of transmission start flag, in the communication control apparatus of the invention, FIG. 12 (d) is a waveform at common data line in timing chart of another embodiment related to generation of transmission start flag, in the communication control apparatus of the invention, FIG. 12 (e) is a waveform of digital filter output in timing chart of another embodiment related to generation of transmission start flag, in the communication control apparatus of the invention, FIG. 12 (f) is a waveform of SOM edge detection in timing chart of another embodiment related to generation of transmission start flag, in the communication control apparatus of the invention, FIG. 12 (g) is a waveform of transmission start flag in timing chart of another embodiment related to generation of transmission start flag, in the communication control apparatus of the invention, FIG. 12 (h) is a waveform of transmit data in timing chart of another embodiment related to generation of transmission start flag, in the communication control apparatus of the invention, FIG. 13 (a) is a waveform of EOM detection flag in timing chart explanatory of operations of the transmission mark generating unit of the case where transmitting is started following another node, in the communication control apparatus of the invention, FIG. 13 (b) is a waveform of output of other nodes in timing chart explanatory of operations of the transmission mark generating unit of the case where transmitting is started following another node, in the communication control apparatus of the invention, FIG. 13 (c) is a waveform at common data line in timing chart explanatory of operations of the transmission mark generating unit of the case where transmitting is started following another node, in the communication control apparatus of the invention, FIG. 13 (d) is a waveform of digital filter output in timing chart explanatory of operations of the transmission mark generating unit of the case where transmitting is started following another node, in the communication control apparatus of the invention, FIG. 13 (e) is a waveform of SOM edge detection in timing chart explanatory of operations of the transmission mark generating unit of the case where transmitting is started following another node, in the communication control apparatus of the invention, FIG. 13 (f) is a waveform of transmission start flag in timing chart explanatory of operations of the transmission mark generating unit of the case where transmitting is started following another node, in the communication control apparatus of the invention, FIG. 13 (g) is a waveform of transmit data in timing chart explanatory of operations of the transmission mark generating unit of the case where transmitting is started following another node, in the communication control apparatus of the invention, FIG. 13 (h) is a waveform of following start detection flag in timing chart explanatory of operations of the transmission mark generating unit of the case where transmitting is started following another node, in the communication control apparatus of the invention, FIG. 13 (i) is a waveform of PWDM sampling clock in timing chart explanatory of operations of the transmission mark generating unit of the case where transmitting is started following another node, in the communication control apparatus of the invention, FIG. 13 (j) is a waveform of usual SOM output in timing chart explanatory of operations of the transmission mark generating unit of the case where transmitting is started following another node, in the communication control apparatus of the invention, FIG. 13 (k) is a waveform of SOM output at following start in timing chart explanatory of operations of the transmission mark generating unit of the case where transmitting is started following another node, in the communication control apparatus of the invention.

FIG. 6 is a block diagram showing a configuration of the essential parts of the communication control apparatus of the invention, that is, portions at which transmitting and receiving are performed, more specifically, portions conducting interfacing with respect to the common data line 4. In the following, at first, explanation will be made on a configuration of the communication control apparatus of the invention referring to the FIG. 6.

As shown in a block diagram in FIG. 6, the essential parts of the communication control apparatus 1 of the invention is composed of a transmitting unit designated by reference numeral 17, and a receiving unit designated by reference numeral 18, and as the others, a sequence control unit 19, a line state detecting unit 29, an echo back comparison detecting unit 30, a PWDM unit 61 for echo back comparing, and the like.

The transmitting unit 17 is composed of a transmitting buffer memory 20, a P to S (Parallel to Serial) shift register 21, a PWM (Pulse Width Modulation) unit 22, transmission mark generating unit 23, a selector 24, a transmitting buffer 2 and the like. In the transmitting buffer memory 20, data to be transmitted is stored. The data train stored in this transmitting buffer memory 20 as parallel data is converted into serial data by the P to S shift register 21. The converted serial data by the P to S shift register 21 is pulse-width modulated by the PWM unit 22. The transmission mark generating unit 23 generates SOM aforementioned. Either of SOM pattern having been generated by the transmission mark generating unit 23 or bit pattern having been modulated by the PWM unit 22 is selected by the selector 24 so as to be outputted from the transmitting buffer 2 to the common data line 4.

And the receiving unit 18 is composed of a receiving buffer 3, a digital filter 25, a PWDM (Pulse Width DeModulation) unit 26, an S to P (Serial to Parallel) shift register 27, a receiving buffer memory 28 and the like. The communication data at the common data line 4 is removed of noise components by a digital filter 25 connected through the receiving buffer 3 so that it may be pulse-width demodulated at the PWDM unit 26. Since the data having been pulse-width demodulated by the PWDM unit 26 is serial data, it is converted into parallel data by the S to P shift register 27 so that it may written in the receiving buffer memory 28.

And at the outside of the transmitting unit 17 and the receiving unit 18, a sequence control unit 19, a line state detecting unit 29, an echo back comparison detecting unit 30, a transmit data abnormality detecting unit 58, a PWDM unit 61 for echo back comparing, and the like are provided.

The transmit data abnormality detecting unit 58 is connected to the output of the transmitting buffer 2 and has a function to judge whether a transmission bit pattern is normal or not, and the detection output thereof is inputted to the sequence control unit 19. And the line state detecting unit 29 is provided so as to observe the state of receive data, and is connected to the output of the digital filter 25. The detection output of the line state detecting unit 29 is given to the transmission mark generating unit 23 and the sequence control unit 29. Further, to the echo back comparison detecting unit 30, the output of the PWDM unit 61 for echo back comparing and the output of the P to S shift register 21 are connected, and the comparison output is connected to the sequence control unit 19.

Next, explanation will be made on the operation of the communication control apparatus of the invention whose essential parts are so configured as shown in a block diagram of FIG. 6 aforementioned, referring to timing charts in FIG. 7 and FIG. 8 showing operation states of the transmitting unit 17, the receiving unit 18, and the echo back comparison detecting unit 30, the transmit data abnormality detecting unit 58, and the sequence control unit 19.

At first, at the time when data to be transmitted is written in the transmitting buffer memory 20, a transmitting buffer full signal shown in FIG. 7 (a) rises to "H" level so as to be inputted to the sequence control unit 19. And in the case where the state of the common data line 4 detected by the line state detecting unit 29 is coincided with IMS shown in FIG. 2 aforementioned, a transmission allowing flag 33 is generated as shown in FIG. 7 (b).

Before explanation will be made on the following operation, explanation will be made on the operation of the line state detecting unit 29, referring to timing charts explanatory of the operation of the line state detecting unit 29 shown in FIG. 9.

FIG. 9 (a) shows a waveform 44 at the common data line 4, and it is assumed that a transmission message frame 63, comprising the SOM 11 being a transmission start mark, communication data 12, the EOM 13 showing an end of a message, and the IMS 14 showing a transmission allowance of the next data, has been transmitted from a communication control apparatus to a common data line 4. At this time, the output 46 of the digital filter 25 shown in FIG. 9 (b) in the receiving unit 18 of the communication control apparatus which has transmitted the transmission message frame 63, is outputted behind a time t1 required for filtering process and is inputted to the line state detecting unit 29. The line state detecting unit 29 having received the output 46 of the digital filter 25 performs SOM edge detection shown in FIG. 9 (c) and generates SOM detection flag shown in FIG. 9 (d), EOM (end of message) flag shown in FIG. 9 (e) and transmission allowing flag (IMS detection flag) 33 shown in FIG. 9 (f)

respectively. In addition, the section from the generation point of the EOM detection flag shown in FIG. 9 (*e*) to the generation point of the transmission allowing flag 33 shown in FIG. 9 (*f*) is the transmission permissible section. And when there is no node which transmits a transmit frame after passing the transmission permissible section, the transmission permissible section will be continued even after IMS 14 detection.

In the following, explanation will be continued on the basis of FIG. 7 and FIG. 8. the sequence control unit 19 generates a transmission start flag 34 showing the transmission start shown in FIG. 7 (*c*) corresponding to the fact that the transmitting buffer full signal 32 aforementioned is inputted and to the transmission allowing flag 33. According to the generation of this transmission start flag 34, all of the configuration elements of the transmitting unit 17 and the transmit data abnormality detecting unit 58 are actuated.

A transmission start mark (SOM), depicted in FIG. 7 (*d*) and generated by the transmission mark generating unit, is provided to one input of the selector 24 and one byte of a transmission data train 40, selected by an address 36 provided to the to the transmitting buffer memory and transferred to the P to S shift register 21 in response to P to S load signal 37, is provided to other input of the selector 24. At this time, since the selector 24 selects the SOM 35 outputted from the transmission mark generating unit 23 according to a selector control signal 38 given from the sequence control unit 19 shown in FIG. 7 (*i*), the SOM 35 is delivered to the common data line 4 through the transmitting buffer 2. After the SOM 35 is delivered to the common data line 4, that is, at the time point at which the SOM detection flag shown in FIG. 9 (*d*) is affirmed, the selector 24 selects the output (PWM output) 42 of the PWM unit 22 shown in FIG. 7 (*h*) according to a selector control signal 38. At this time point, a P to S shift clock 39 shown in FIG. 7 (*f*) is inputted to the P to S shift register 21. The P to S shift register shifts out the highest data bit (7) of a byte of the transmit data stored therein is triggered by the rising edge of the clock 39.

In the following, the P to S shift register 21 serial-outputs the output bit data being from the second highest output bit data (6) to the lowest output bit data (0) of the transmit data train 40 of one byte successively as serial data, by performing shift operation with the rising to "H" level of the P to S shift clock 39 as trigger.

On the other hand, the serial output data bit of the P to S shift register 21 aforementioned to be inputted to the PWM unit 22 is pulse-width modulated successively by the PWM unit 22 and outputted to the selector 24 as the PWM output 42 shown in FIG. 7 (*h*). At this time, since the selector 24, as aforementioned, selects the PWM output 42, the PWM output 42 is transmitted to the common data line 4 through the transmitting buffer 2 as a selector output 43 shown in FIG. 7 (*j*), and a waveform 44 at the common data line 4 is to be the one shown in FIG. 8 (*k*).

Next, explanation will be made on the operation of the transmit data abnormality detecting unit 58, referring to timing charts explanatory of the operation of the transmit data abnormality detecting unit 58 shown in FIG. 10.

To the transmit data abnormality detecting unit 58, the output of the transmitting buffer 2 being the transmit data 64 shown in FIG. 10 (*a*) is inputted, and as shown in FIG. 10 (*b*), the transmit data abnormality detecting unit 58 detects something abnormal of the output bit pattern from the transmitting buffer 2 on the basis of a transmit data abnormality detecting clock 59 being a sampling clock.

Figure 1:
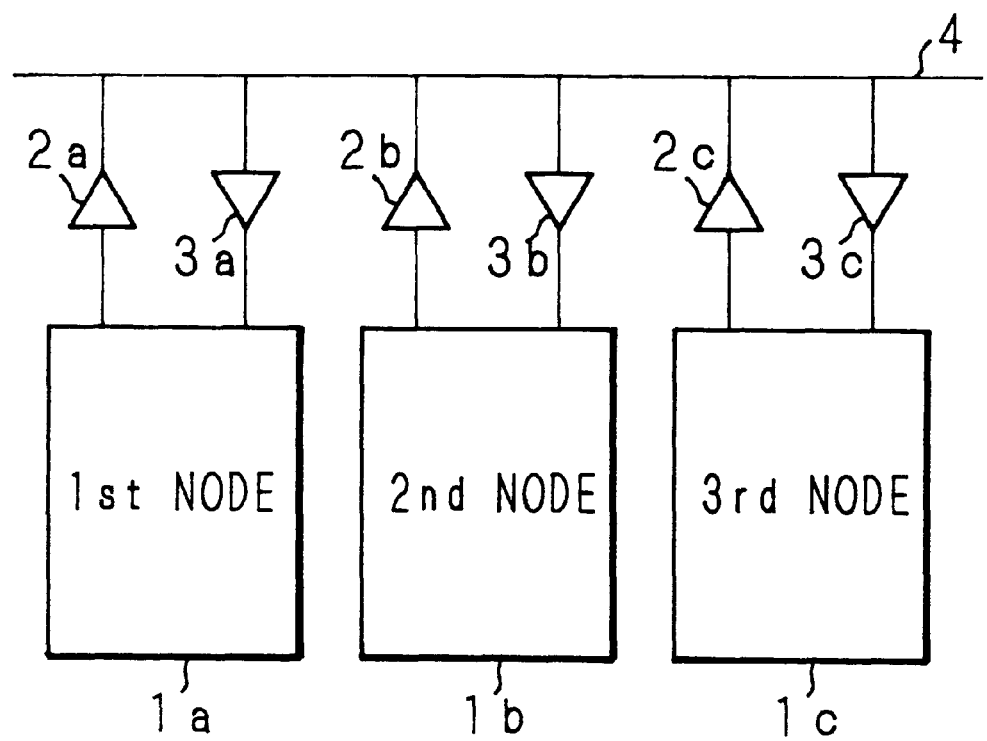
FIG. 1 is a schematic diagram showing a general configuration example of a conventional communication system in which a plurality of nodes are connected with respect to a common line, FIG. 2 (a) is a waveform diagram showing examples of conventional bit patterns of "1" which have been pulse-width modulated, and generally used in a communication apparatus, FIG. 2 (b) is a waveform diagram showing examples of conventional bit patterns of "0" which have been pulse-width modulated, and generally used in a communication apparatus, FIG. 2 (c) is a waveform diagram showing examples of conventional bit patterns of SOM which have been pulse-width modulated, and generally used in a communication apparatus, FIG. 2 (d) is a waveform diagram showing examples of conventional bit patterns of EOM which have been pulse-width modulated, and generally used in a communication apparatus, FIG. 2 (e) is a waveform diagram showing examples of conventional bit patterns of IMS which have been pulse-width modulated, and generally used in a communication apparatus.
Figure 2:
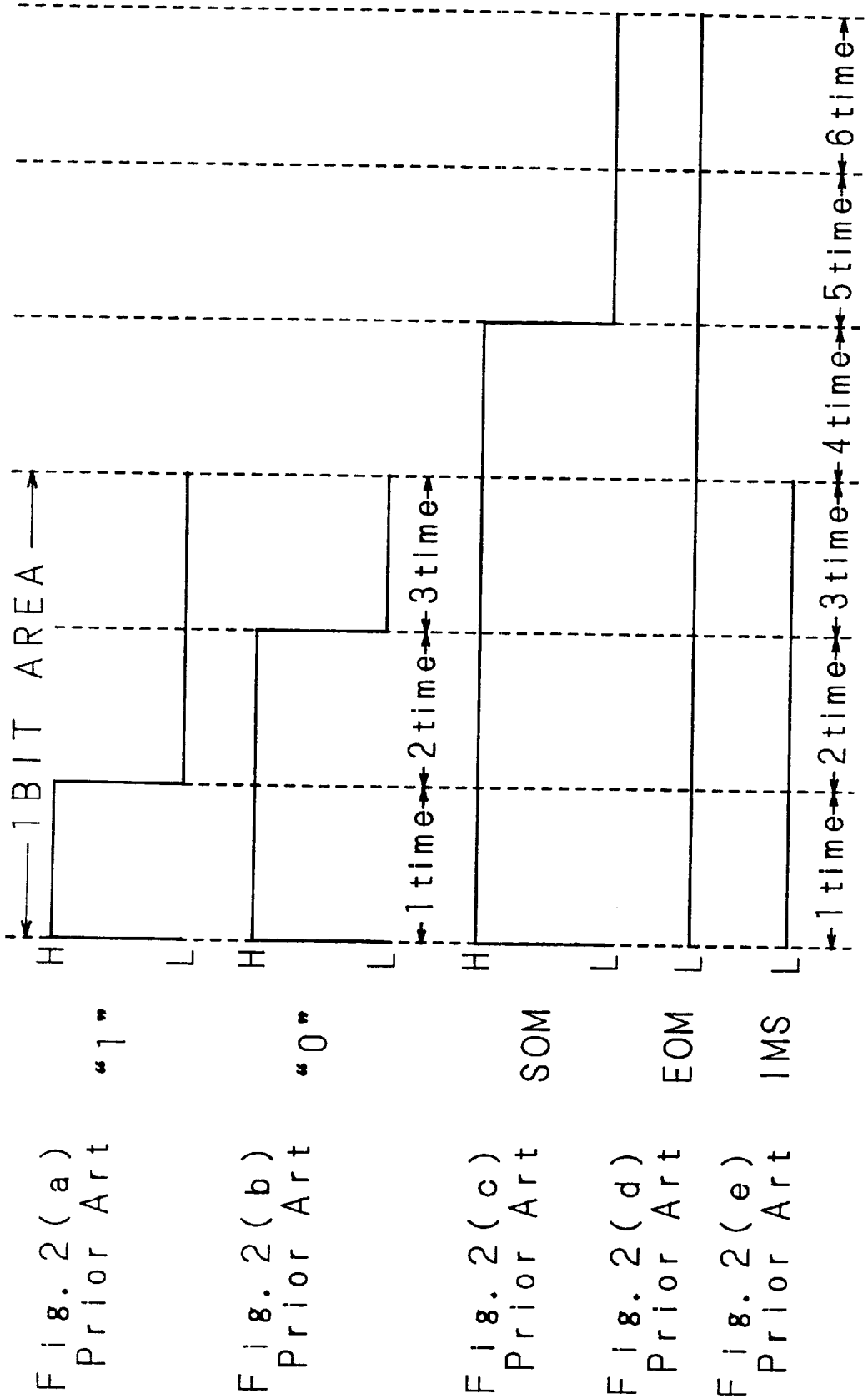
Figure 3:
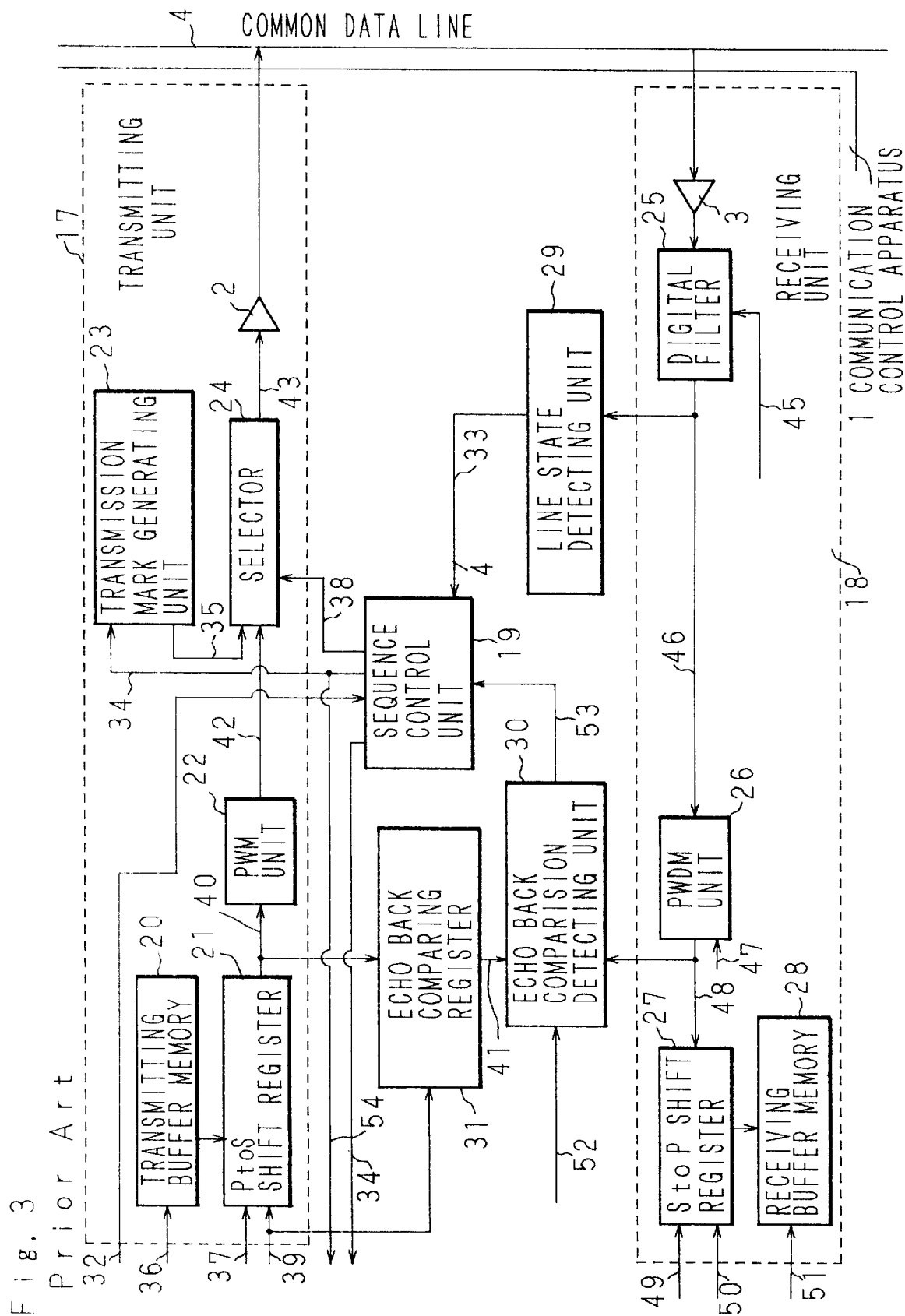
FIG. 3 is a block diagram showing a configuration of essential parts of the conventional communication control apparatus, FIG. 4 (a) is a waveform of transmitting buffer full signal in timing chart explanatory of operations of the transmitting unit, receiving unit, and echo back comparison detecting unit and sequence control unit of the conventional communication control apparatus, FIG. 4 (b) is a waveform of transmission allowing flag in timing chart explanatory of operations of the transmitting unit, receiving unit, and echo back comparison detecting unit and sequence control unit of the conventional communication control apparatus, FIG. 4 (c) is a waveform of transmission start flag of timing chart explanatory of operations of the transmitting unit, receiving unit, and echo back comparison detecting unit and sequence control unit of the conventional communication control apparatus, FIG. 4 (d) is a waveform of transmission start mark SOM in timing chart explanatory of operations of the transmitting unit, receiving unit, and echo back comparison detecting unit and sequence control unit of the conventional communication control apparatus, FIG. 4 (e) is a waveform of P to S load signal in timing chart explanatory of operations of the transmitting unit, receiving unit, and echo back comparison detecting unit and sequence control unit of the conventional communication control apparatus, FIG. 4 (f) is a waveform of P to S shift clock in timing chart explanatory of operations of the transmitting unit, receiving unit, and echo back comparison detecting unit and sequence control unit of the conventional communication control apparatus, FIG. 4 (g) is a waveform of P to S shift register highest output data in timing chart explanatory of operations of the transmitting unit, receiving unit, and echo back comparison detecting unit and sequence control unit of the conventional communication control apparatus, FIG. 4 (h) is a waveform of echo back comparing resister output in timing chart explanatory of operations of the transmitting unit, receiving unit, and echo back comparison detecting unit and sequence control unit of the conventional communication control apparatus, FIG. 4 (i) is a waveform of PWM output in timing chart explanatory of operations of the transmitting unit, receiving unit, and echo back comparison detecting unit and sequence control unit of the conventional communication control apparatus, FIG. 4 (j) is a waveform of selector control signal in timing chart explanatory of operations of the transmitting unit, receiving unit, and echo back comparison detecting unit and sequence control unit of the conventional communication control apparatus, FIG. 5 (k) is a waveform of selector output in timing chart explanatory of operations of the transmitting unit, receiving unit, and echo back comparison detecting unit and sequence control unit of the conventional communication control apparatus, FIG. 5 (l) is a waveform at common data line in timing chart explanatory of operations of the transmitting unit, receiving unit, and echo back comparison detecting unit and sequence control unit of the conventional communication control apparatus, FIG. 5 (m) is a waveform of digital filtering sampling clock in timing chart explanatory of operations of the transmitting unit, receiving unit, and echo back comparison detecting unit and sequence control unit of the conventional communication control apparatus, FIG. 5 (n) is a waveform of digital filter output in timing chart explanatory of operations of the transmitting unit, receiving unit, and echo back comparison detecting unit and sequence control unit of the conventional communication control apparatus, FIG. 5 (o) is a waveform of PWDM sampling clock in timing chart explanatory of operations of the transmitting unit, receiving unit, and echo back comparison detecting unit and sequence control unit of the conventional communication control apparatus, FIG. 5 (p) is a waveform of PWDM output in timing chart explanatory of operations of the transmitting unit, receiving unit, and echo back comparison detecting unit and sequence control unit of the conventional communication control apparatus, FIG. 5 (q) is a waveform of echo back comparing clock in timing chart explanatory of operations of the transmitting unit, receiving unit, and echo back comparison detecting unit and sequence control unit of the conventional communication control apparatus, FIG. 5 (r) is a waveform of echo back comparison detecting data in timing chart explanatory of operations of the transmitting unit, receiving unit, and echo back comparison detecting unit and sequence control unit of the conventional communication control apparatus, FIG. 5 (s) is a waveform of S to P shift clock in timing chart explanatory of operations of the transmitting unit, receiving unit, and echo back comparison detecting unit and sequence control unit of the conventional communication control apparatus, FIG. 5 (t) is a waveform of transmission stop signal in timing chart explanatory of operations of the transmitting unit, receiving unit, and echo back comparison detecting unit and sequence control unit of the conventional communication control apparatus.

When explanation is made further in detail, the transmit data abnormality detecting unit 58 judges whether or not SOM mark is normal pattern shown in FIG. 2 during a period of first six clocks of the transmit data abnormality detecting clock 59 shown in FIG. 7 (b), and judges whether or not the bit pattern of the highest bit data (7) of the transmit data train is a normal pattern shown in FIG. 2 aforementioned during a period of the next three clocks of the transmit data abnormality detecting clock 59.

In the following, by performing the same operation, the transmit data abnormality detecting unit 58 judges bit pattern of the transmit data train successively. As shown in FIG. 10, in the case where the judgment results in abnormal bit pattern data, the transmit data abnormality detecting unit 58 outputs as detection data "H" level signal to the sequence control unit 19 as a transmit data abnormality detection flag 60 at the timing shown in FIG. 10 (*c*). The sequence control unit 19 which has received the transmit data abnormality detection flag 60 finishes transmitting operation by generating a transmission stop signal 54 at the timing shown in FIG. 10 (*d*).

In addition, in FIG. 8 (*t*), the transmit data abnormality detecting clock 59 is shown, in FIG. 8 (*u*), the transmit data abnormality detection flag 60, and in FIG. 8 (*v*), the transmission stop signal 54 is shown respectively, however, what are shown in FIG. 7, FIG. 8 and FIG. 10 are examples in each of which the transmission stop signal 54 is generated in the case where bit pattern of the second highest output bit data (6) of the transmit data train 40 of one byte shown in FIG. 7 (*g*) is abnormal. In such a case, the waveform 44 at the common data line 4 is to be the one as shown in FIG. 10 (*e*).

Next, explanation will be made on the operation of the receiving unit 18. The waveform 44 at the common data line 4 is transmitted to the digital filter 25 through the receiving buffer 3. The digital filter 25 outputs digital filter output 46 as shown in FIG. 8 (*m*) obtained by filtering-processing the modulated serial data on the basis of a digital filtering sampling clock 45 shown in FIG. 8 (*l*) so as to input it to the PWDM unit 26. At this time, as shown in FIG. 8 (*m*), since time t1 is required for filtering processing, a digital filter output 46 is behind the time t1 with respect to the waveform 44 at the common data line 4.

And the PWDM unit 26 outputs to the S to P shift register 27 a PWDM output 48 shown in FIG. 8 (*o*) as serial data, obtained by pulse-width demodulating a digital filter output 46 on the basis of "H" level pulse of a PWDM sampling clock 47 shown in FIG. 8 (*n*). Time t2 required for a demodulating process shown in FIG. 8 (*o*) is to be a delay time of output timing of the PWDM output 48 being demodulated serial data with respect to output timing of the digital filter output 46.

Next, by being given a shift clock 49 shown in FIG. 8 (*s*), the S to P shift register 27 takes in pulse-width demodulated data successively. At the time point when eight bit data is taken in the S to P shift register 27, by being given a pulse 50 which opens a receiving buffer writing gate (not shown in FIG. 6), parallel data for one byte is written in the receiving buffer memory 28 corresponding to a receiving buffer address 51. In the following, according to the same operations, receive data train is stored successively in the receiving buffer memory 28.

On the other hand, to the PWDM unit 61 for echo back comparing which performs pulse-width demodulation for echo back comparing, the output 46 of the digital filter 25 is inputted. The PWDM unit 61 for echo back comparing demodulates data on the basis of the PWDM sampling clock 47.

Hereupon, explanation will be made on the differences and operations of the PWDM unit 61 for echo back comparing and the PWDM unit 26 for demodulating receive data referring to timing charts in FIG. 11 explanatory of the PWDM unit 26 and the PWDM unit 61 for echo back comparing shown in FIG. 6.

The digital filter output 46 shown in FIG. 11 (a) is demodulated on the basis of the PWDM sampling clock 47 shown in FIG. 11 (d). The PWDM unit 26 obtains the demodulated output 48 as shown in FIG. 11 (b) according to three clocks of the PWDM sampling clock 47 which corresponds to one bit section. When explanation is made in detail, in the case where the digital filter output 46 shown in FIG. 11 (a) is bit "0", the first clock (the first time) of the PWDM sampling clock 47 shown in FIG. 11 (d) is "H", the second clock (the second time) is "H", and the third clock (the third time) is "L", and at the third time, the PWDM unit 26 detects that the PWDM demodulated output 48 is bit "0" as shown in FIG. 11 (b). The time t2 required for demodulating is to be a delay time of the PWDM unit 26 with respect to the waveform 44 at the common data line 4.

On the other hand, the PWDM unit 61 for echo back comparing obtains a demodulated output 62 as shown in FIG. 11 (c) according to two clocks of the PWDM sampling clock 47 shown in FIG. 11 (d). When the explanation is made in detail, in the case where the digital filter output 46 shown in FIG. 11 (a) is bit "0", at the time when it is judged that the first clock (the first time) of the PWDM sampling clock 47 shown in FIG. 11 (d) is "H" and the second clock (the second time) is "H", the demodulated output 62 of the PWDM unit 61 for echo back comparing is judged to be bit "0" as shown in FIG. 11 (c) and "L" is outputted. In the case where the digital filter output 46 shown in FIG. 11 (a) is bit "1", at the time when it is judged that the first clock (the first time) is "H" and the second clock (the second time) is "L", the demodulated output 62 of the PWDM unit 61 for echo back comparing is judged to be bit "1" as shown in FIG. 11 (c) and "H" is outputted.

Since the PWDM unit 61 for echo back comparing is so operated as aforementioned, t3 shown in FIG. 11 (d) is enough for the time required for demodulating, and time is shortened by one time as compared with the PWDM demodulation by the PWDM unit 26.

Explanation will be continued on the echo back comparison operation referring to FIG. 7 and FIG. 8 again.

The echo back comparison detecting unit 30 compares the P to S shift register highest output data 40 shown in FIG. 7 (g) and the PWDM output 62 for echo back comparing shown in FIG. 8 (p) with each other on the basis of a timing of an echo back comparing clock 52 shown in FIG. 8 (q). In the case where the comparison results are not coincided with each other, "H" level signal is outputted, and in the case where the results are coincided with each other, "L" level signal is outputted, that is, an echo back comparison detecting data 53 is outputted from the echo back comparison detecting unit 30 to the sequence control unit 19 at a timing shown in FIG. 8 (r). The sequence control unit 19 which has received "H" level signal of the case where the aforesaid echo back comparison results are not coincided with each other, outputs a transmission stop signal 54 at a timing shown in FIG. 8 (v) and the transmitting operation is finished.

Hereupon, since the delay time required for judging by the PWDM unit 61 for echo back comparing is t3 and the transmission stop signal 54 is generated in a section during the bits transmitted from the transmitting unit 17, it is always generated in a section of "L" of the transmitting output bit pattern with respect to the common data line 4.

An example in which a timing of transmission starting explained referring to FIG. 7 and FIG. 8 is generated by the fact that the sequence control unit 19 makes the transmission start flag 34 as a trigger according to transmission allowing flag 33, however, it is also possible to take another method. FIG. 12 shows timing charts of another example related to generation of the transmission start flag 34, and in the following, explanation will be made referring to the timing charts in FIG. 12.

As shown in FIG. 12 (a), at first a message end detection flag EOM 55 is detected by the line state detecting unit 29 so as to be outputted to the sequence control unit 19. From this point, a transmission allowing section is started. At this point, as shown in FIG. 12 (b), in the case where the buffer full signal 32 already has been generated, the apparatus is in the state that the IMS to come next is waited. But in the case where the output from another node is delivered to the common data line 4, as shown in FIG. 12 (c) in the transmission allowing section, the waveform 44 at the common data line 4 shown in FIG. 12 (d) is inputted to the digital filter 25 through the receiving buffer 3, and the digital filter output 46 shown in FIG. 12 (e) is inputted to the line state detecting unit 29. In the line state detecting unit 29, SOM edge detection shown in FIG. 12 (f) is performed, and the output thereof is inputted to the sequence control unit 19 as the signal 33. At this time, since the sequence control unit 19 immediately outputs the transmission start flag 34 as shown in FIG. 12 (g), the transmitting unit 17 is actuated, and the output of the transmit data 64 is started as shown in FIG. 12 (h) following a signal outputted from another node shown in FIG. 12 (c). In this case, as shown in FIG. 12 (h), data, with phase delay by the time t1 required for filtering process of the digital filter 25, is to be transmitted.

Next, explanation will be made in detail on the operation of the transmission mark generating unit 23, referring to the timing charts explanatory of the operation state of the transmission mark generating unit 23.

The transmission mark SOM 35 explained referring to FIG. 7 and FIG. 8 is generated by the transmission mark generating unit 23 according to a bit pattern shown in FIG. 2, however, as explained before, the operation of the transmission mark generating unit 23 of the case where transmission is started following another node is to be the one shown in the timing charts in FIG. 13.

After EOM detection shown in FIG. 13 (a) is finished, in the case where the transmitting output of another node shown in FIG. 13 (b) in a transmission allowing section appears as the waveform 44 at the common data line 4 as shown in FIG. 13 (c), the output 46 of the digital filter 25 in the receiving unit 18 shown in FIG. 13 (d) is outputted behind the time t1 required for filtering process. After receiving the digital filter output 46, the line state detecting unit 29 performs SOM edge detection shown in FIG. 13 (e) and the output, that is, SOM edge detection signal is inputted to the sequence control unit 19 and the transmission mark generating unit 23 as the transmission allowing flag 33. In the sequence control unit 19, as shown in FIG. 13 (f), the transmission start flag 34 is generated according to the operation aforementioned, thereby the transmitting unit 17 is actuated. And in the transmission mark generating unit 23, a following start detection flag 71 is detected according to SOM edge detecting signal, as shown in FIG. 13 (h). The following start detection flag 71 can be detected, for example, by a circuit as configured as shown in FIG. 14.

The circuit for detecting the following start detection flag 71 shown in FIG. 14 is composed of an S-R flip flop 200 and an AND gate 201 of three inputs. The S-R flip flop 200 is inputted the message end detection flag EOM 55 at a set terminal S and the transmission allowing flag 33 at a reset terminal R, respectively, and an output signal from an output terminal Q is given to the AND gate 201. The other two inputs of the AND gate 201 are the transmission buffer full signal 32 and an SOM edge detecting signal 55. And the output signal of the AND gate 201 is to be the following start detection flag 71.

In the case where the following start detection flag 71 is detected in this way, the transmission mark generating unit 23 adjusts "H" section of the transmission start mark SOM 35 so that it is shortened by the time t1 as compared with a usual case shown in FIG. 13 (*j*) as shown in FIG. 13 (*k*). According to this adjusting, the transmit data 64 shown in FIG. 13 (*g*) is outputted without a phase difference between another node.

In the following, explanation will be made on the configuration and operation of the transmission mark generating unit 23 which adjusts "H" section of the transmission start mark SOM 35 aforementioned to be shortened by the time t1.

Figure 15:
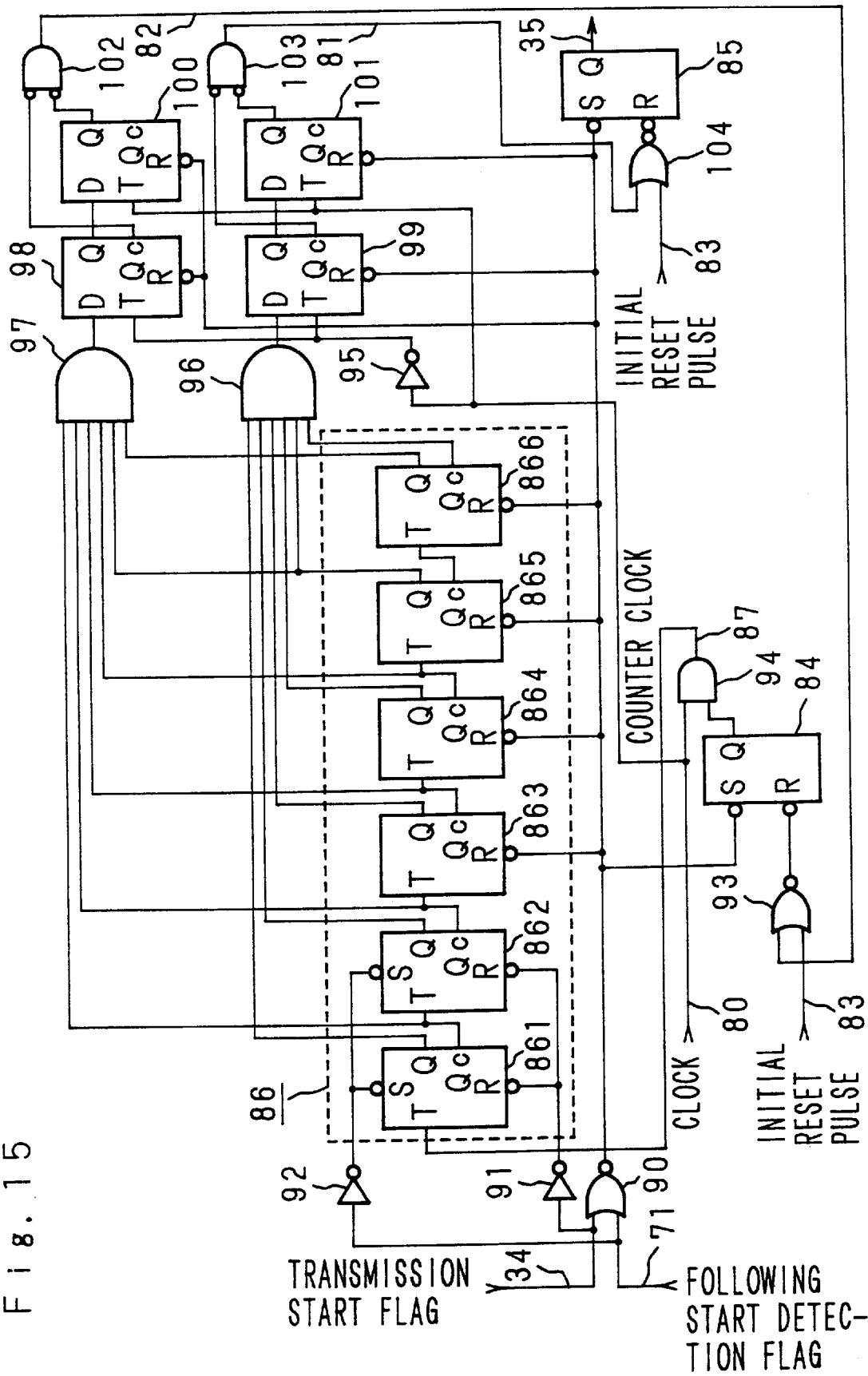
FIG. 15 is a block diagram showing a configuration of the transmission mark generating unit of the communication control apparatus of the invention, FIG. 16 (a) is a waveform of clock in timing chart explanatory of the operation of the transmission mark generating unit of the communication control apparatus of the invention, FIG. 16 (b) is a waveform of transmission start flag in timing chart explanatory of the operation of the transmission mark generating unit of the communication control apparatus of the invention, FIG. 16 (c) is a waveform of first transmission mark control signal in timing chart explanatory of the operation of the transmission mark generating unit of the communication control apparatus of the invention, FIG. 16 (d) is a waveform of second transmission mark control signal in timing chart explanatory of the operation of the transmission mark generating unit of the communication control apparatus of the invention, FIG. 16 (e) is a waveform of transmission mark control signal in timing chart explanatory of the operation of the transmission mark generating unit of the communication control apparatus of the invention, FIG. 16 (f) is a waveform of following start detection flag in timing chart explanatory of the operation of the transmission mark generating unit of the communication control apparatus of the invention, FIG. 16 (g) is a waveform of first transmission mark control signal in timing chart explanatory of the operation of the transmission mark generating unit of the communication control apparatus of the invention, FIG. 16 (h) is a waveform of second transmission mark control signal in timing chart explanatory of the operation of the transmission mark generating unit of the communication control apparatus of the invention, FIG. 16 (i) is a waveform of transmission start mark SOM in timing chart explanatory of the operation of the transmission mark generating unit of the communication control apparatus of the invention, FIG. 17 (a) is a waveform of EOM detection flag in timing chart explanatory of the operation of the conventional communication apparatus without SOM adjusting function, FIG. 17 (b) is a waveform of output of other nodes in timing chart explanatory of the operation of the conventional communication apparatus without SOM adjusting function, FIG. 17 (c) is a waveform at common data line in timing chart explanatory of the operation of the conventional communication apparatus without SOM adjusting function, FIG. 17 (d) is a waveform of digital filter output in timing chart explanatory of the operation of the conventional communication apparatus without SOM adjusting function, FIG. 17 (e) is a waveform of SOM edge detection in timing chart explanatory of the operation of the conventional communication apparatus without SOM adjusting function, FIG. 17 (f) is a waveform of transmission start flag in timing chart explanatory of the operation of the conventional communication apparatus without SOM adjusting function, FIG. 17 (g) is a waveform of transmit data in timing chart explanatory of the operation of the conventional communication apparatus without SOM adjusting function, and FIG. 17 (h) is a waveform of PWDM sampling clock in timing chart explanatory of the operation of the conventional communication apparatus without SOM adjusting function.
Figure 17A:
Figure 17B:
Figure 17C:
Figure 17D:
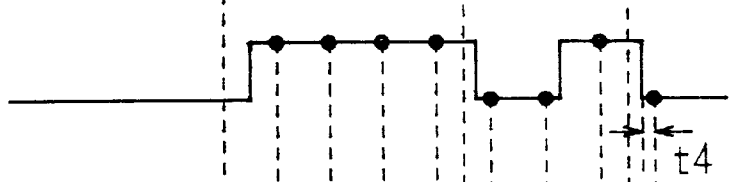
Figure 17E:
Figure 17F:
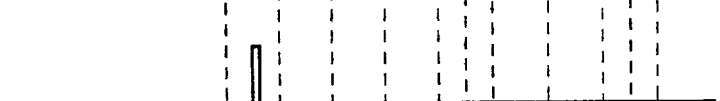
Figure 17G:
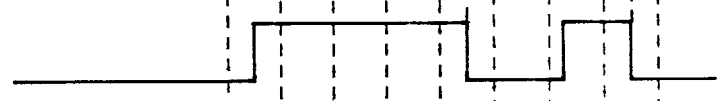
Figure 17H:
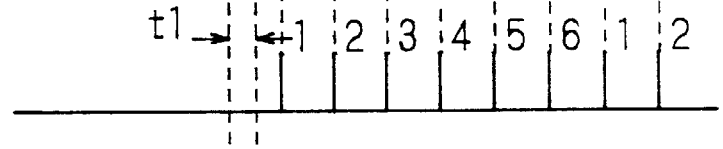

FIG. 15 is a block diagram showing a configuration of the transmission mark generating unit 23.

In FIG. 15, reference numeral 90 designates an NOR gate of two inputs to which the transmission start flag 34 and the following start detection flag 71 is inputted. In addition, the transmission start flag 34 is also inputted through an inverter 91 to the reset terminals R of the first stage and second stage T-flip flops 861 and 862 among the six T-flip flops 861 through 866 configuring a counter 86. The following start detection flag 71 is also inputted through an inverter 92 to set terminals S of the first stage and second stage T-flip flops 861 and 862 of the counter 86.

To the reset terminals R of the third stage through sixth stage T-flip flops 863 through 866 of the counter 86, the output signal of the NOR gate 90 is inputted respectively. The output signals from the output terminal Q of the T-flip flops 861 through 865 and the output signal from the output terminal Qc (an inverted signal of the output signal from the output terminal Q) are inputted to an AND gate 96, and the output signals from the output terminals Qc of the T-flip flops 861 through 864 and the output signals from the output terminals Q of the T-flip flops 865 and 866 are inputted to the AND gate 97, respectively. On the other hand, to the first stage T-flip flop 861, a counter clock 87 which is an output signal of an AND gate 94 to be described later is inputted, and the output signal of the output terminal Qc of the T-flip flop 861 is inputted to the input terminal T of the second stage T-flip flop 862. In the following, the output signals from the output terminals Qc of the second stage, third stage, fourth stage and fifth stage T-flip flops 862 through 865 are inputted to the respectively input terminals T of the next stage T-flip flops 863 through 866, and the output signal from the output terminal Qc of the sixth stage T-flip flop 866 is inputted to the AND gate 96 as aforementioned.

The AND gate 94 has two inputs, to one input terminal thereof, a clock 80 being inputted, and to the other input terminal, an output signal from an output terminal Q of an S-R flip flop 84 being inputted respectively. To the set terminal S of the S-R flip flop 84, the output signal of the NOR gate 90 aforementioned is inputted, and to the reset terminal R. an output signal of an OR gate 93 is inputted, respectively. The OR gate 93 has two inputs, to one input terminal thereof, an initial reset pulse 83 being inputted, to the other input terminal, a second transmission mark control signal 82 to be described later being inputted, respectively. And, as aforementioned, the output signal of the AND gate 94 is given to the counter 86 as the counter clock 87.

The output signal of the AND gate 96 is inputted to an input terminal D of a D-flip flop 99, and the output signal form an output terminal Q of the D-flip flop 99 is inputted to an input terminal D of an D-flip flop 101, and the output signal from an output terminal Qc is inputted to one input terminal of an AND gate 103 whose two inputs are both negative logic, respectively. And the output signal from an output terminal Q of the D-flip flop 101 is inputted to the other input terminal of the AND gate 103 aforementioned. On the other hand, the output signal of the AND gate 97 is inputted to an input terminal D of the D-flip flop 98 of the AND gate 97, and the output signal from the output terminal Q of the D-flip flop 98 is inputted to an input terminal D of a D-flip flop 100, and the output signal from an output terminal Qc is inputted to one input terminal of an AND gate 102 whose two inputs are both negative logic, respectively. And the output signal from an output terminal Q of the D-flip flop 100 is inputted to the other input terminal of the AND gate 102 aforementioned. In addition, to the input terminals T of the D-flip flops 100 and 101, the clock 80 is inputted after being inverted by an inverter 95 and to the D-flip flops 98, 99, the clock 80 is inputted intact.

The output signal of the AND gate 102 is inputted as a second transmission mark control signal 82 to the OR gate 93 in such a way as aforementioned, and the output signal of the AND gate 103 is inputted as a first transmission mark control signal 81 to one input terminal of an NOR gate of two inputs. To the other input terminal of this NOR gate 104, the initial reset pulse 83 is inputted, and the output signal thereof is inputted to a reset terminal R of an S-R flip flop 85. To the set terminal S of the S-R flip flop 85, the output signal of the NOR gate 90 is inputted, and the output signal from the output terminal Q is the transmission start mark 35.

The basic operation of the transmission mark generating unit 23 so configured as in this way is described as follows. That is, to the transmission mark generating unit 23, the transmission start flag 34, the following start detection flag 71, the clock 80 and the initial reset pulse 83 are inputted from the outside, and the transmission start mark SOM 35 is outputted. In the embodiment shown here, in the case where transmission is started according to the usual transmission start flag 34, the transmission start mark SOM 35 keeps a high level "H" during 31 clocks with respect to the clock 80, and keeps a low level "L" during 17 clocks after that. And in the case where transmission is started according to the following start detection flag 71, the transmission start mark SOM 35 keeps a high level "H" during 28 clocks with respect to the clock 80, and keeps a low level "L" during 17 clocks after that. That is, in this case, the time t1 is adjusted to be three clocks.

In the following, explanation will be made specifically on the operation of the transmission mark generating unit 23, referring to timing charts in FIG. 16.

At first, explanation will be made on the case where transmission is started according to the usual transmission start flag 34.

As shown in FIG. 16 (*b*), when the transmission start flag 34 is inputted to the transmission mark generating unit 23, the S-R flip flop 85 is set and the transmission start mark SOM 35 which is the output signal thereof is changed to "H" as shown in FIG. 16 (*e*). And at the same time, all bits of the counter 86, that is, all of T-flip flops 861 through 866 are reset, and further, the output signal from the output terminal Q of the S-R flip flop 84 is also changed to "H". Thereby, since the counter clock 87 is inputted to the counter 86, the counter 86 starts counting. And at the time when the counter 86 counts 31 clocks as shown in FIG. 16 (*a*), the first transmission mark control signal 81 of "H" is outputted as shown in FIG. 16 (*c*).

In this way, according to the fact that the first transmission mark control signal 81 is changed to "H", the S-R flip flop 85 is reset and the transmission start mark SOM 35 which is the output signal thereof is changed to "L" as shown in FIG. 16 (*e*). After this, the counter 86 continues counting of the counter clock 87, in succession and at the time when 48 clocks are counted as shown in FIG. 16 (*d*), the second transmission mark control signal 82 of "H" is outputted.

According to outputting the second transmission mark control signal 82, since the S-R flip flop 84 is reset and the output signal from the output terminal Q thereof is changed to "L", supplying of the counter clock 87 to the counter 86 is stopped. Thereby, transmitting of the transmission start mark SOM 35 is finished.

Next, explanation will be made on the operation of the case where transmission is started according to the following start detection flag 71.

As shown in FIG. 16 (*f*), when the following start detection flag 71 is inputted to the transmission mark generating unit 23, the S-R flip flop 85 is set and the transmission start mark SOM 35 which is the output signal thereof is changed to "H" as shown in FIG. 16 (*i*). At the same time, the first bit and second bit, that is, T-flip flops 861 and 862 of the counter 86 are set, and the other four bits, that is, T-flip flops 863 through 866 are reset. Further, the output signal from the output terminal Q of the S-R flip flop 84 is also changed to "H". Thereby, since the --counter clock 87 is inputted to the counter 86, the counter 86 starts counting. And, as shown in FIG. 16 (*a*), at the time when the counter 86 have counted 28 counts, the first transmission mark control signal 81 of "H" is outputted.

In this way, by the fact that the first transmission mark control signal 81 is changed to "H", S-R flip flop 85 is reset, and the transmission start mark SOM 35 which is the output signal thereof is changed to "L" as shown in FIG. 16 (*i*). After this, the counter 86 continues counting of the counter clock 87 in succession, and at the time when 45 clocks are counted as shown in FIG. 16 (*a*), the second transmission mark control signal 82 of "H" is outputted as shown in FIG. 16 (*h*).

According to outputting the second transmission mark control signal 82, since the S-R flip flop 84 is reset and the output signal form the output terminal Q thereof is changed to "L", supplying of the counter clock 87 to the counter 86 is stopped. Thereby, the transmission of the transmission start mark SOM 35 is finished.

As aforementioned, in the transmission mark generating unit 23, it is possible to change the time t1 optionally by setting of the initial value of the counter 86. In this embodiment, the time t1 is set to be 3 clocks, however, it is of course possible to set the time to be another number of clock.

In addition, the embodiment abovementioned is so configured that the PWDM unit 61 from echo back comparing and the PWDM unit 26 are provided separately, however, such configuration that the output 62 of the PWDM unit 61 for echo back comparing, is inputted to the S to P shift register 27 so that it may be demodulated receive data, is also possible.

Such configuration that the echo back comparison detecting unit 30 is installed at a position where the output of the transmitting buffer 2 and the output of the digital filter 25 are compared with each other, the comparison being made every one time is also possible. And the case where such configuration is adopted, the necessity of another detecting unit is not damaged.

As explained as aforementioned, according to the communication control apparatus of the invention, it becomes possible to match a phase of output data from another node at which transmission has been started earlier with a phase of output from itself, since the SOM edge detecting signal 55 of another node in a transmission allowing section detected by the line state detecting unit 29 is given to the transmission mark generating unit 23 as well as the transmission mark generating unit 23 has a function that it adjusts the SOM waveform of the node of itself according to the SOM edge detecting signal 55.

When explanation will be made further referring to FIG. 13 and FIG. 17, FIG. 17 is an example of the case where there is no adjusting function of SOM, and transmission data output from another node shown in FIG. 17 (*b*) and transmit data 64 from the node of itself shown in FIG. 17 (*g*) are outputted respectively to the common data line 4 keeping a phase difference of the time t1 for filtering process of the digital filter 25 as shown in FIG. 17 (*b*). In this case, the waveform at the common data line 4 is as shown in FIG. 17 (*c*).

On the other hand, at a node of the receiving side, receiving process is performed with respect to the waveform 44 at the common data line 4, and pulse-width demodulation is performed accordingly to sampling on the basis of the PWDM sampling clock 47 shown in FIG. 17 (*h*). At this time, a tolerance of the PWDM sampling clock 47 with respect to the digital filter output 46 shown in FIG. 17 (*d*) is the time t4, in other words, delay capacity according to load resistance and load capacity connected to the common data line 4 can be said to be a time t4. On the other hand, in case of the communication control apparatus of the invention having the SOM adjusting function shown in FIG. 13, since a time t5 shown in FIG. 13 (*d*) is to be a delay tolerance being allowed to the common data line 4, echo back comparison accuracy is improved as well as delay at the common data line 4 is difficult to be effected.

And PWDM unit which pulse-width demodulate serial receive data having been pulse-width demodulated in the receiving unit 18 is provided as the PWDM unit 26 for converting usual receive data and is also provided as the PWDM unit 61 for echo back comparing exclusively used for echo back comparison unit 30. Further, the PWDM unit 61 for echo back comparing has a function for performing pulse-width demodulation by use of the first time and the second time of the sampling clock, so that it becomes possible to detect echo back comparison result immediately. And a process of stopping transmission to the common data line 4 of the cases where echo back comparisons are not coincided with each other, can also be done immediately. Therefore, it can be prevented that a meaningless signal is transmitted to the common data line 4.

On the other hand, by providing the transmission data abnormality detecting unit 58, whether or not something abnormal is generated at a bit pattern transmitted from the node of itself is observed, and in the case where something abnormal is generated, since transmission from the node of itself can be stopped, it can be prevented that abnormal data is transmitted to the common data line 4.

As aforementioned, according to the present invention, it becomes possible to match a phase of output data from another node at which transmission is started earlier with a phase of output data from itself. Therefore, since a phase difference of both data is in a delay tolerance allowed to the common data line, the echo back comparison accuracy is improved and delay at the common data line is difficult to be effected.

And since the PWDM units, each of which pulse-width demodulates serial data, are provided for converting original receive data and for echo back comparing and the PWDM unit for echo back comparing has a function of pulse-width demodulating by using the first and second times of the sampling clock, it becomes possible to detect echo back comparison result immediately. Therefore, in the case where echo back comparison results are not coincided with each other, a process of stopping transmission to the common data line can also be done immediately and it can be prevented that a meaningless signal is transmitted to the common data line.

Further, by providing a transmit data abnormality detecting unit, it becomes possible to detect before transmitting to the data line whether or not something abnormal is generated at a bit pattern generated from itself. And in the case where something abnormal is detected, since transmission from itself can be stopped, it becomes possible to prevent transmission of abnormal data to the common data line.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A communication control apparatus, coupled to a common data line, for transmitting and receiving data messages, each message including communication data preceded by a mark SOM (Start of Message) which indicates beginning of message transmission starting to and from said common data line, with the SOM having a duration of a predetermined time interval, and said communication data followed by a mark EOM (End of Message) which indicates end of message transmission to or from said common data line, with said apparatus asserting a transmitting buffer full signal when data is ready to transmit, a transmission ending signal when an EOM is transmitted on said common data line, and a SOM detection signal when an SOM is transmitted on said common data line, said apparatus comprising:

a PWM unit for pulse-width modulating data to be transmitted and outputting the pulse-width modulated data as the communication data included in a transmitted data message;

SOM generating means for shortening the duration of the mark SOM included in the transmitted data message when the transmitting buffer full signal is asserted to indicate a transmission request, the EOM signal is asserted to indicate that transmission of a previous message on the common data line has ended, and the SOM detection signal is asserted after the EOM signal is asserted, with assertion of the SOM detection signal indicating detection of a change of state of said common data line; and a selector, controlled by a selector control signal, for first selecting the SOM from said SOM generating means to be transmitted in the transmitted data message and then selecting the communication data from said PWM unit to be transmitted in the transmitted data message.

2. A communication control apparatus, coupled to a common data line, for transmitting and receiving data messages, each message including communication data preceded by a mark SOM (Start of Message) which indicates beginning of message transmission starting to and from said common data line, with the SOM having a duration of a predetermined time interval, and said communication data followed by a mark ROM (End of Message) which indicates end of message transmission to or from said common data line, with said apparatus asserting a transmitting buffer full signal when data is ready to transmit, a transmission ending signal when an EOM is transmitted on said common data line, and a SOM detection signal when an SOM is transmitted on said common data line, said apparatus comprising:

a PWM unit for pulse-width modulating data to be transmitted and outputting the pulse-width modulated data as the communication data included in a transmitted data message;

SOM generating means for outputting the mark SOM having a duration of the predetermined time interval to be included in the transmitted data message when the transmitting buffer full signal is asserted to indicate a transmission request and the EOM signal is asserted to indicate that transmission of a previous message on the common data line has ended, and for outputting a shortened mark SOM included in the transmitted data message, with duration to the shortened mark SOM being shorter than the predetermined time interval when the transmitting buffer full signal is asserted to indicate a transmission request, the EOM signal is asserted to indicate transmission of a previous message has ended, and the SOM detection signal is asserted after the EOM signal is asserted, with the assertion of the SOM detection signal indicate detection of a change of the state of common data line; and a selector, controlled by a selector control signal, for first selecting the SOM from said SOM generating means to be transmitted in the transmitted data message and then selecting the communication data from said PWM unit to be transmitted in the transmitted data message.

3. A communication control apparatus, coupled to a common data line, for transmitting and receiving data messages, each message including communication data preceded by a mark SOM (Start of Message) which indicates beginning of message transmission starting to and from said common data line, with the SOM having a duration of a predetermined time interval, and said communication data followed by a mark EOM which indicates end of message transmission to or from said common data line, and with data messages separated by a mark IMS (Intermessage Separation), with said apparatus asserting a transmitting buffer full signal when data is ready to transmit, said apparatus comprising:

a PWM unit for pulse-width modulating data to be transmitted and outputting the pulse-width modulated data as the communication data included in a transmitted data message;

a following start detection unit which receives the transmitting buffer full signal indicating a transmission request, a transmission allowing flag which means transmission allowed, an EOM detection flag indicating detecting of EOM (End of Message) which means transmission ending and an SOM edge detecting signal indicating detection of the state change of said common data line after detection of the EOM, with said transmission mark generating unit including means for asserting a following start detection flag indicating a following start when said transmitting buffer full signal indicates a transmission request and said SOM edge detecting signal indicates detection of state change after said EOM detection flag indicates detection of EOM;

an SOM generating unit, coupled to receive said following start detection signal, with said SOM generating unit being activated to output the mark SOM, having the duration of the predetermined time interval, in the transmitted data message when said input transmission start flag is asserted to indicate transmission starting and said transmission following flag is not asserted, and with said SOM generating unit activated to output a shortened mark SOM included in the transmitted data message, with the duration of the shortened mark SOM being shorter than the predetermined time interval, when said input following start detection flag is asserted to indicate a following start;

a selector, controlled by a selector control signal, for first selecting the SOM from said SOM generating unit and then selecting the communication data from said PWM unit to transmit in a data message to said common data line;

a digital filter for detecting the state of said common data line based on a digital filter sampling clock and outputting a digital filter output;

a PWDM unit for pulse width demodulating said digital filter output from said digital filter and outputting a demodulated output;

a line state detecting unit which receives said digital filter output from said digital filter, asserts said EOM detection flag indicating a detection of EOM to said following start detection unit when EOM is detected from said received digital filter output, asserts said SOM edge detecting signal indicating detection of the state change of said common data line when the state of said received digital filter output is changed after detection of the EOM, and asserts said transmission allowing flag indicating transmission allowing when a mark IMS (Inter-Message Separation) is detected from said received digital filter output and when said SOM edge detecting signal indicates detection of state change; and a sequence control unit which receives said transmission allowing flag from said line state detecting unit and said transmitting buffer full signal, and asserts the transmission start flag, which means transmission starting, to said following start detection generating unit when said received transmission allowing flag indicates transmission allowing and said received transmitting buffer full signal indicates a transmission request.

4. A communication control apparatus, coupled to a common data line, for transmitting and receiving data messages, each message including communication data preceded by a mark SOM (Start of Message) which indicates beginning of message transmission starting to and from said common data line, with the SOM having a duration of a predetermined time interval, and said communication data followed by a mark EOM (End of Message) which indicates end of message transmission to or from said common data line, with said apparatus asserting a transmitting buffer full signal when data is ready to transmit, a transmission ending signal when an EOM is transmitted on said common data line, and a SOM detection signal when an SOM is transmitted on said common data line, said apparatus comprising:

a PWM unit for pulse-width modulating data to be transmitted and outputting the pulse-width modulated data as the communication data included in a transmitted data message; and SOM generating means for shortening the duration of the mark SOM included in the transmitted data message when the transmitting buffer full signal is asserted to indicate a transmission request, the EOM signal is asserted to indicate that transmission of a previous message on the common data line has ended, and the SOM detection signal is asserted after the EOM signal is asserted, with assertion of the SOM detection signal indicating detection of a change of state of said common data line.

5. A communication control apparatus, coupled to a common data line, for transmitting and receiving data messages, each message including communication data preceded by a mark SOM (Start of Message) which indicates beginning of message transmission starting to and from said common data line, with the SOM having a duration of a predetermined time interval, and said communication data followed by a mark EOM (End of Message) which indicates end of message transmission to or from said common data line with said apparatus asserting a transmitting buffer full signal when data is ready to transmit, a transmission ending signal when an EOM is transmitted on said common data line, and a SOM detection signal when an SOM is transmitted on said common data line, said apparatus comprising:

a PWM unit for pulse-width modulating data to be transmitted and outputting the pulse-width modulated data as the communication data included in a transmitted data message; and SOM generating means for outputting the mark SOM having a duration of the predetermined time interval to be included in the transmitted data message when the transmitting buffer full signal is asserted to indicate a transmission request and the EOM signal is asserted to indicate that transmission of a previous message on the common data line has ended, and for outputting a shortened mark SOM included in the transmitted data message, with duration of the shortened mark SOM being shorter than the predetermined time interval when the transmitting buffer full signal is asserted to indicate a transmission request, the EOM signal is asserted to indicate transmission of a previous message has ended, and the SOM detection signal is asserted after the EOM signal is asserted, with the assertion of the SOM detection signal indicate detection of a change of the state of common data.

* * * * *